United States Patent
Trachewsky et al.

(10) Patent No.: US 8,144,798 B2
(45) Date of Patent: *Mar. 27, 2012

(54) LONG TRAINING SEQUENCE FOR MIMO WLAN SYSTEMS

(75) Inventors: Jason A. Trachewsky, Menlo Park, CA (US); R. Tushar Moorti, Mountain View, CA (US); Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 12/493,896

(22) Filed: Jun. 29, 2009

(65) Prior Publication Data

US 2009/0262859 A1  Oct. 22, 2009

Related U.S. Application Data

(63) Continuation of application No. 10/929,313, filed on Aug. 30, 2004, now Pat. No. 7,555,053.

(60) Provisional application No. 60/562,168, filed on Apr. 14, 2004.

(51) Int. Cl.
*H04B 7/02* (2006.01)

(52) U.S. Cl. ........ 375/267; 375/148; 375/259; 375/260; 375/295; 375/316; 455/68; 455/132; 455/136

(58) Field of Classification Search .................. 375/146, 375/147, 148, 150, 135, 219, 259, 260, 267, 375/297, 306, 322, 342, 343, 350, 263, 299, 375/316, 347, 349, 262

See application file for complete search history.

(56) References Cited

U.S. PATENT DOCUMENTS

| | | | |
|---|---|---|---|
| 8,054,739 B2 * | 11/2011 | Nakao et al. | 370/203 |
| 2003/0181170 A1 * | 9/2003 | Sim | 455/101 |
| 2004/0127168 A1 * | 7/2004 | Ito | 455/82 |
| 2005/0113120 A1 * | 5/2005 | Rappaport et al. | 455/500 |
| 2005/0163236 A1 * | 7/2005 | Hammerschmidt et al. | 375/260 |
| 2005/0180314 A1 * | 8/2005 | Webster et al. | 370/208 |
| 2005/0220209 A1 * | 10/2005 | Lewis | 375/267 |
| 2005/0226142 A1 * | 10/2005 | Moorti et al. | 370/208 |
| 2005/0233709 A1 * | 10/2005 | Gardner et al. | 455/101 |
| 2007/0147545 A1 * | 6/2007 | Doi | 375/316 |
| 2007/0230431 A1 * | 10/2007 | Driesen et al. | 370/345 |
| 2008/0285670 A1 * | 11/2008 | Walton et al. | 375/260 |

* cited by examiner

*Primary Examiner* — Hirdepal Singh

(74) *Attorney, Agent, or Firm* — Garlick & Markison; Shayne X. Short; Bruce E. Garlick

(57) ABSTRACT

A method for configuring a multiple input multiple output (MIMO) wireless communication begins by generating a plurality of preambles for a plurality of transmit antennas. Each of the plurality of preambles includes a carrier detection sequence at a legacy transmit rate, a first channel sounding at the legacy transmit rate, a signal field at the legacy transmit rate, and Z-1 channel soundings at a MIMO transmit rate, where L corresponds to a number of channel soundings. The method continues by simultaneously transmitting the plurality of preambles via the plurality of transmit antennas.

20 Claims, 18 Drawing Sheets

LONG TRAINING SEQUENCE FOR MIMO WLAN SYSTEMS

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/929,313, entitled "Long training sequence for MIMO WLAN systems,", filed Aug. 30, 2004, pending, and scheduled to be issued as U.S. Pat. No. 7,555,053 on Jun. 30, 2009, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 60/562,168, entitled "Long training sequence for MIMO WLAN systems,", filed Apr. 14, 2004, now expired.

BACKGROUND OF THE INVENTION

1. Technical Field of the Invention

This invention relates generally to wireless communication systems and more particularly to interoperability within a wireless communication system between next generation and legacy wireless terminals.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11 (Wireless Local Area Networks "WLANs"), Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the data recovery stage performs numerous operations to recover data from the filtered signals. Such operations include, for an IEEE 802.11a or IEEE 802.11g compliant receiver, guard interval removal, fast Fourier transform, demapping and slicing, de-interleaving, and decoding. The decoding utilizes a channel estimation to produce the recovered data from de-interleaved data. In accordance with the IEEE 802.11a and/or IEEE 802.11g standard, a frame includes a short training sequence (STS), a long training sequence (LTS), a signal field, and a plurality of data fields. The IEEE 802.11a and/or IEEE 802.11g standard further indicates that channel estimation is to be done during the long training sequence. Once the channel estimation is determined, it is used for the remainder of the frame.

Currently, next generation WLANs are being developed that will co-exist with IEEE 802.11a, IEEE 802.11b, and/or IEEE 802.11g stations (STAs) and access points (APs). One contemplated next generation system includes a Multi-Input-Multi-Output (MIMO) interface (802.11n). The MIMO interface of the next generation system must be interoperable with the legacy STAs and base stations. Interoperability requires that the legacy devices identify next generation transmissions and respond accordingly. Such interoperation includes at least two particular operations. In a first operation, an AP supports both legacy and next generation STAs. In a second operation, legacy and next generation STAs share a channel, i.e., co-channel/"overlapping" BSS. In each of these cases the Physical Layer Convergence Procedure (PLCP) header must allow an IEEE 802.11a/b/g STA to identify next generation transmissions and to deassert clear channel assessment (CCA) indication or use a protection mechanism like Request-to-Send/Clear-to-Send (RTS/CTS) or CTS-to-sent procedures to avoid conflict with the transmissions. In each of these cases, the next generation preamble must be backwards compatible in order to allow the legacy devices to recognize the next generation transmissions.

Therefore, a need exists for a next generation preamble that is recognizable by legacy devices and that also supports the next generation device requirements.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
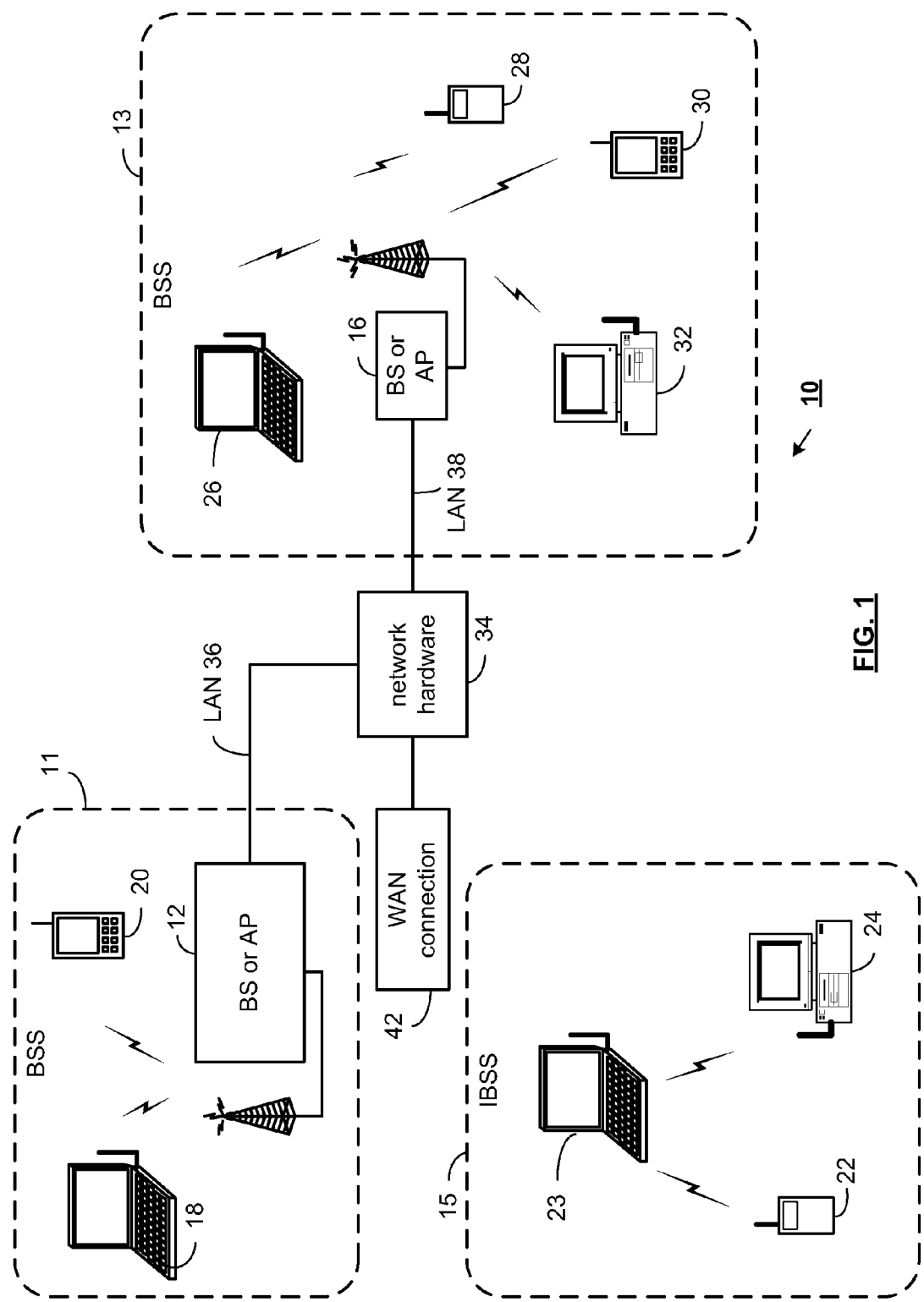
FIG. 1 is a schematic block diagram of a wireless communication system in accordance with the present invention.

FIG. 1 is a schematic block diagram illustrating a communication system 10 that includes a plurality of base stations and/or access points 12 and 16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of at least some of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12 and 16 has an associated antenna or antenna array to communicate with the wireless communication devices in its regional area, which is generally referred to as a basic service set (BSS) 11, 13. Typically, the wireless communication devices register with a particular base station or access point 12 or 16 to receive services from the communication system 10.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Wireless communication devices 22, 23, and 24 are located in an area of the wireless communication system 10 where they are not affiliated with an access point. In this region, which is generally referred to as an independent basic service set (IBSS) 15, the wireless communication devices communicate directly (i.e., point-to-point or point-to-multiple point), via an allocated channel to produce an ad-hoc network.

Figure 2:
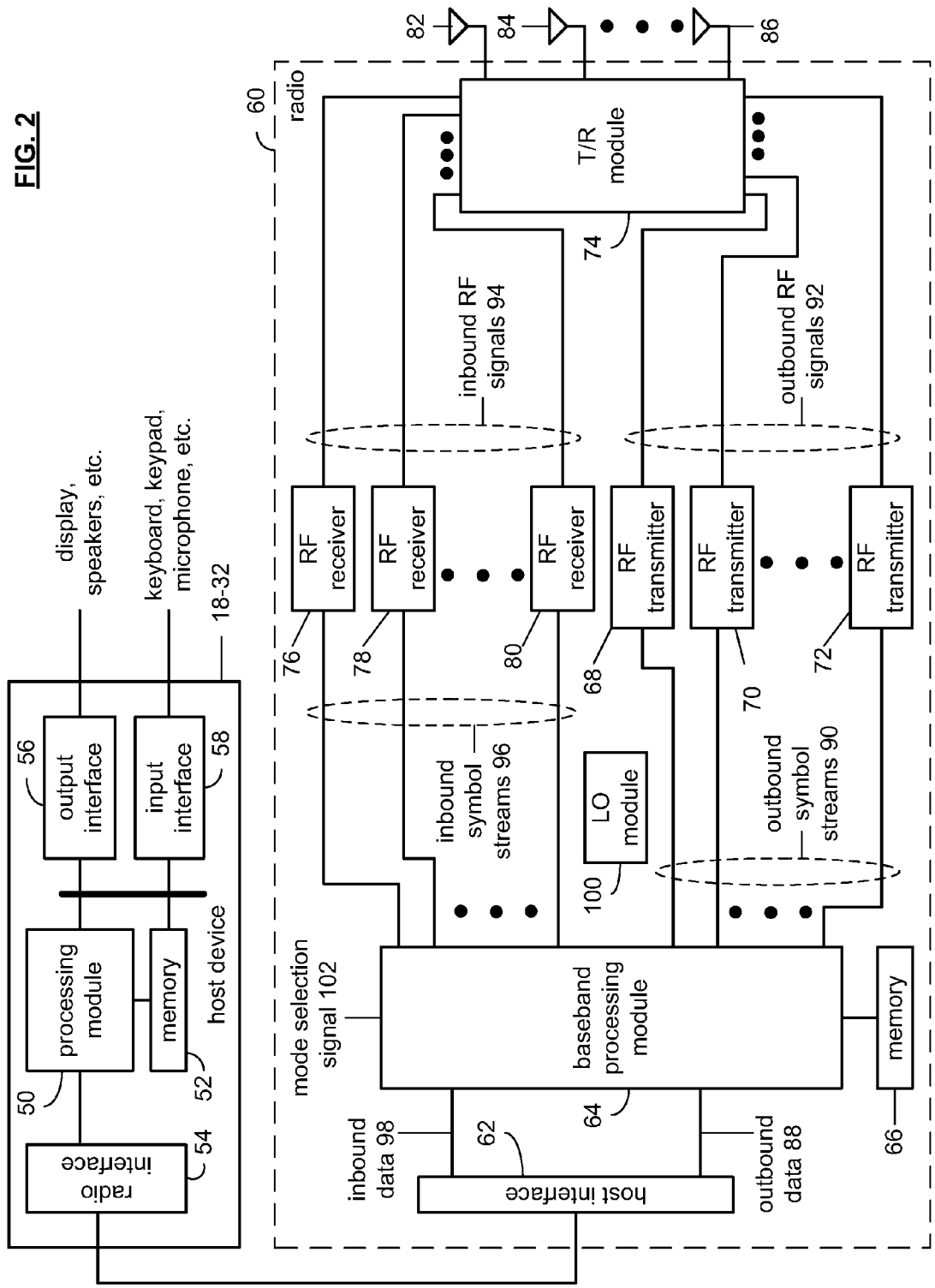
FIG. 2 is a schematic block diagram of a wireless communication device in accordance with the present invention.

FIG. 2 is a schematic block diagram illustrating a wireless communication device that includes the host device 18-32 and an associated radio, or station, 60. For cellular telephone hosts, the radio 60 is a built-in component. For personal digital assistants hosts, laptop hosts, and/or personal computer hosts, the radio 60 may be built-in or an externally coupled component. In this embodiment, the station may be compliant with one of a plurality of wireless local area network (WLAN) protocols including, but not limited to, IEEE 802.11n. The device of FIG. 2 is a Multi-Input-Multi-Output (MIMO) device. IEEE 802.11n devices are referred to herein interchangeably as next generation WLAN devices while IEEE 802.11a/b/g devices are referred to herein as legacy devices, which are Multi-Input-Single-Output (MISO) devices. However, the MISO devices, illustrated in more detail with reference to FIG. 3, must be interoperable with the MIMO device of FIG. 2.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio, or station, 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102 may indicate a frequency band of 2.4 GHz, a channel bandwidth of 20 or 22 MHz and a maximum bit rate of 54 megabits-per-second or greater, e.g., 122 MBPS. In this general category, the mode selection signal will further indicate a particular rate. In addition, the mode selection signal may indicate a particular type of modulation, which includes, but is not limited to, Barker Code Modulation, BPSK, QPSK, CCK, 16 QAM and/or 64 QAM.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received. The baseband processing module 60 receives the inbound symbol streams 90 and converts them into inbound data 98, which is provided to the host device 18-32 via the host interface 62. For a further discussion of an implementation of the radio, or station, 60 refer to co-pending patent application entitled WLAN TRANSMITTER HAVING HIGH DATA THROUGHPUT, having a Ser. No. 10/856,023 and a provisional filing date of Feb. 19, 2004 and co-pending patent application entitled WLAN RECEIVER HAVING AN ITERATIVE DECODER, having a Ser. No. 10/876,230 and a provisional filing date of Feb. 19, 2004.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
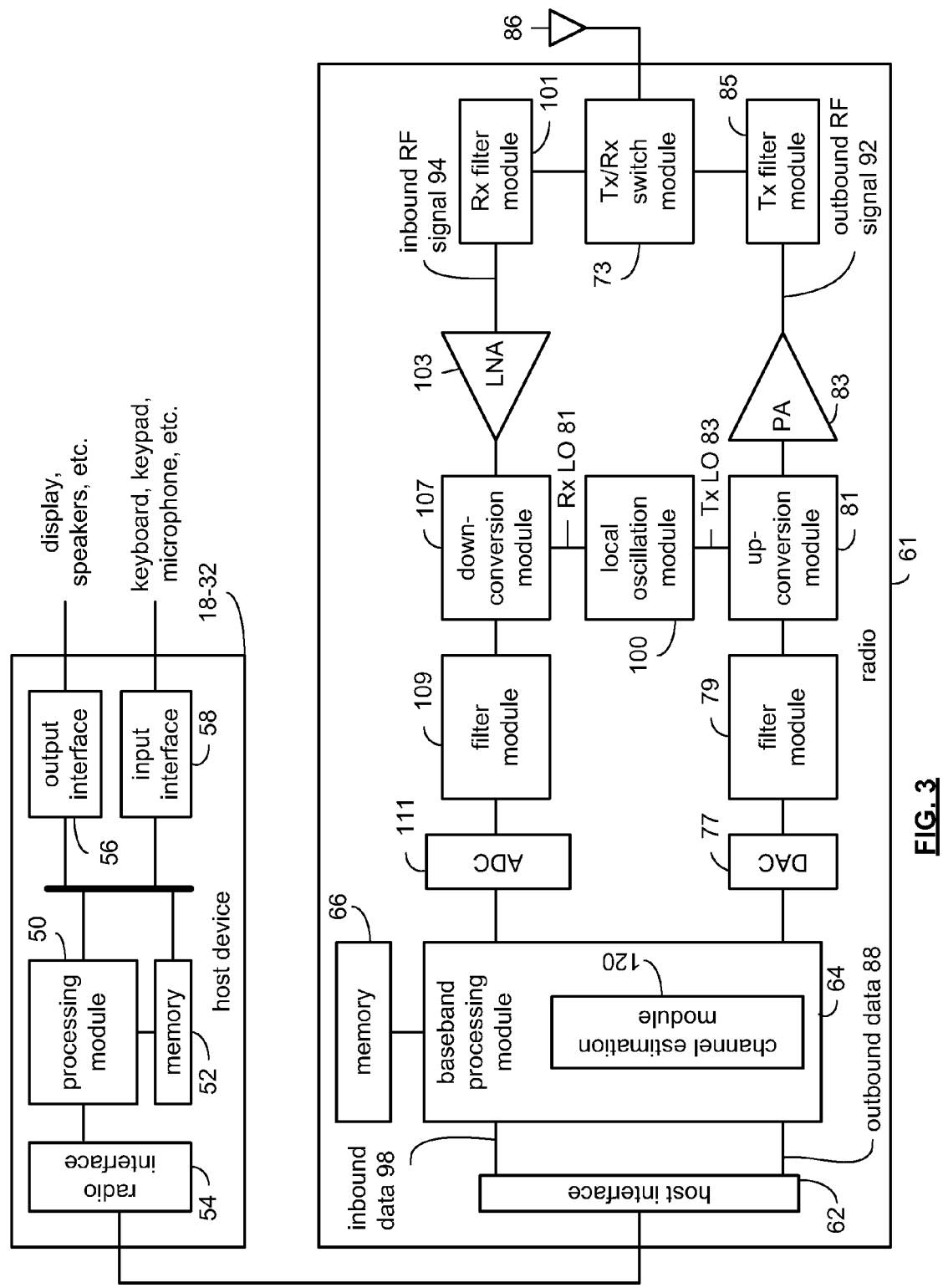
FIG. 3 is a schematic block diagram of a wireless communication device in accordance with the present invention.

FIG. 3 is a schematic block diagram illustrating a wireless communication device that includes the host device 18-32 and an associated radio 61. For cellular telephone hosts, the radio 61 is a built-in component. For personal digital assistants hosts, laptop hosts, and/or personal computer hosts, the radio 61 may be built-in or an externally coupled component. The host device 18-32 operates as discussed above with reference to FIG. 1. The WLAN device of FIG. 3 may operate in compliance with one or more of the IEEE 802.11 a/b/g operating standards. As distinguished from the MIMO device of FIG. 2, the device of FIG. 3 is a MISO device.

Radio 61 includes a host interface 62, baseband processing module 64, an analog-to-digital converter 111, a filter module 109, an IF mixing down conversion stage 107, a receiver filter 101, a low noise amplifier 103, a transmitter/receiver switch 73, a local oscillation module 74, memory 66, a digital transmitter processing module 76, a digital-to-analog converter 78, a filter module 79, an IF mixing up conversion stage 81, a power amplifier 83, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant. The baseband processing module 64 functions as described above and performs one or more of the functions illustrated in FIGS. 5-19.

In operation, the radio 61 receives outbound data 88 from the host device via the host interface 62. The host interface 62 routes the outbound data 88 to the baseband processing module 64, which processes the outbound data 88 in accordance with a particular wireless communication standard (e.g., IEEE 802.11a/b/g, Bluetooth, et cetera) to produce outbound time domain baseband (BB) signals.

The digital-to-analog converter 77 converts the outbound time domain baseband signals from the digital domain to the analog domain. The filtering module 79 filters the analog signals prior to providing them to the IF up-conversion module 81. The IF up conversion module 81 converts the analog baseband or low IF signals into RF signals based on a transmitter local oscillation 83 provided by local oscillation module 100. The power amplifier 83 amplifies the RF signals to produce outbound RF signals 92, which are filtered by the transmitter filter module 85. The antenna 86 transmits the outbound RF signals 92 to a targeted device such as a base station, an access point and/or another wireless communication device.

The radio 61 also receives inbound RF signals 94 via the antenna 86, which were transmitted by a base station, an access point, or another wireless communication device. The antenna 86 provides the inbound RF signals 94 to the receiver filter module 101 via the Tx/Rx switch 73. The Rx filter 71 bandpass filters the inbound RF signals 94 and provides the filtered RF signals to the low noise amplifier 103, which amplifies the RF signals 94 to produce amplified inbound RF signals. The low noise amplifier 72 provides the amplified inbound RF signals to the IF down conversion module 107, which directly converts the amplified inbound RF signals into inbound low IF signals or baseband signals based on a receiver local oscillation 81 provided by local oscillation module 100. The down conversion module 70 provides the inbound low IF signal or baseband signal to the filtering/gain module 68. The filtering module 109 filters the inbound low IF signals or the inbound baseband signals to produce filtered inbound signals.

The analog-to-digital converter 111 converts the filtered inbound signals into inbound time domain baseband signals. The baseband processing module 64 decodes, descrambles, demaps, and/or demodulates the inbound time domain baseband signals to recapture inbound data 98 in accordance with the particular wireless communication standard being implemented by radio 61. The host interface 62 provides the recaptured inbound data 92 to the host device 18-32 via the radio interface 54.

As one of average skill in the art will appreciate, the wireless communication device of FIG. 3 may be implemented using one or more integrated circuits. For example, the host device may be implemented on one integrated circuit, the baseband processing module 64 and memory 66 may be implemented on a second integrated circuit, and the remaining components of the radio 61, less the antenna 86, may be implemented on a third integrated circuit. As an alternate example, the radio 61 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 4:
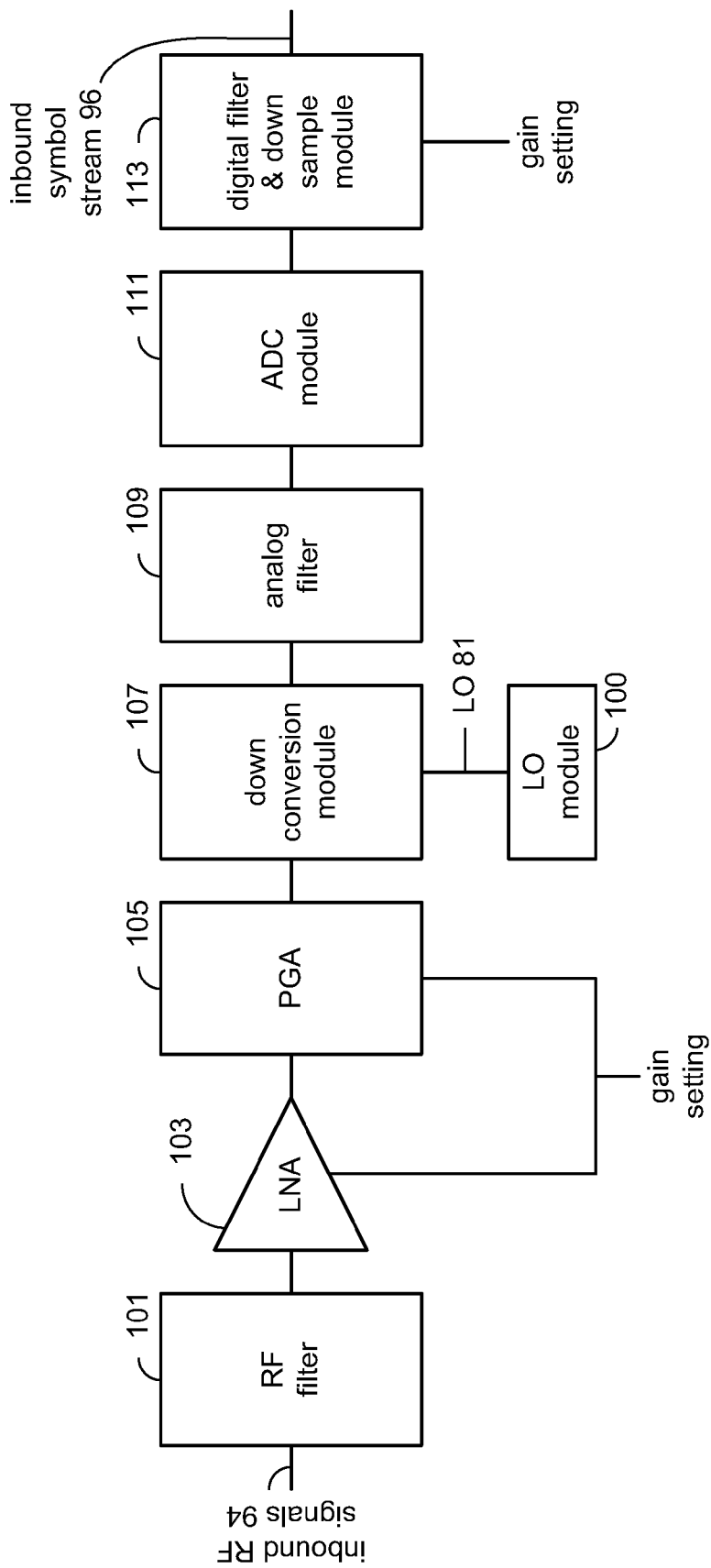
FIG. 4 is a schematic block diagram of a receiver section of the wireless communication device of FIG. 2 in accordance with the present invention.

FIG. 4 is a schematic block diagram of each of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the inbound symbol stream 96.

Figure 5:
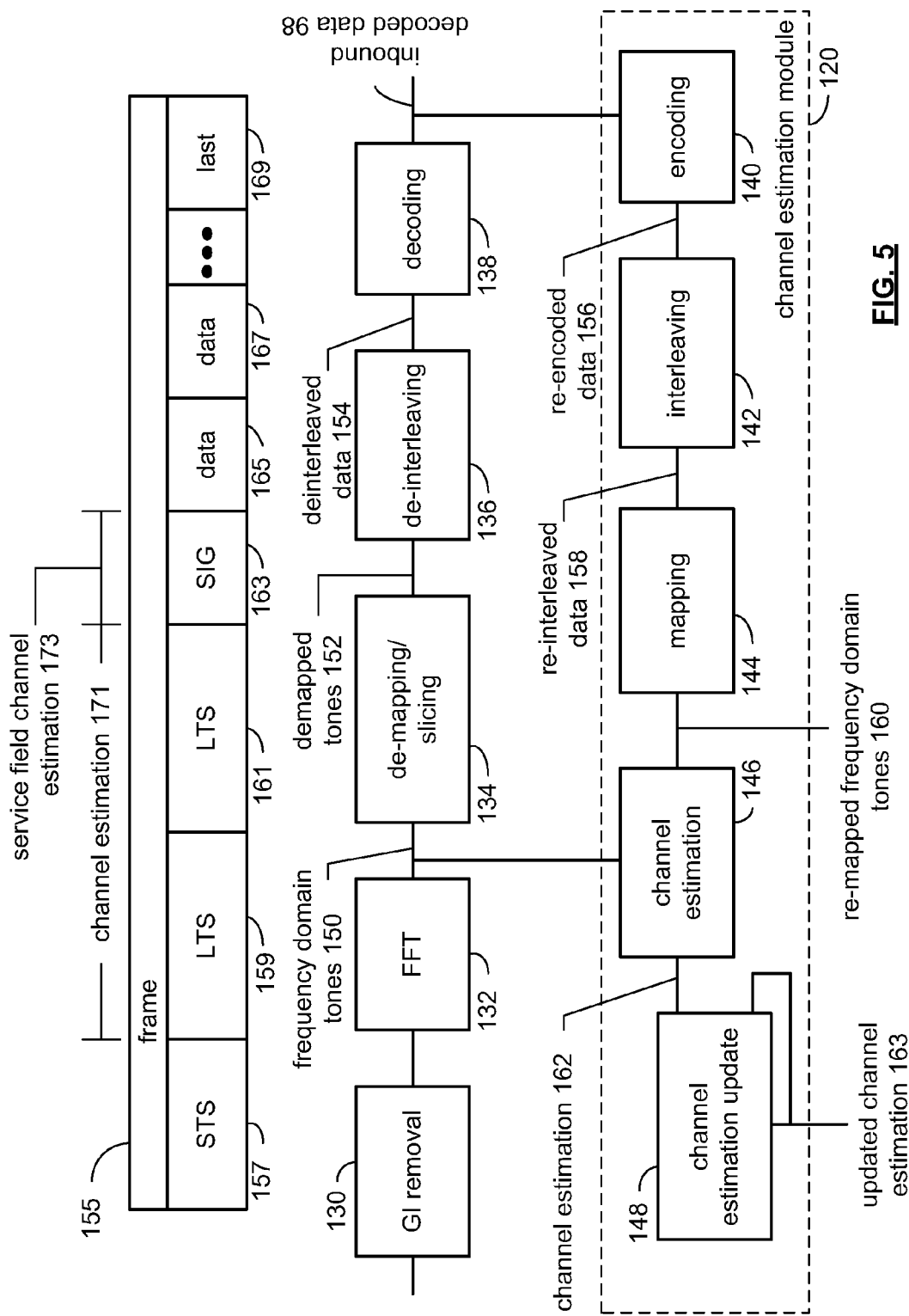
FIG. 5 is a schematic block diagram of an embodiment of a baseband processing module of the wireless communication device of FIG. 3 in accordance with the present invention.

FIG. 5 is a functional schematic block diagram of an implementation of the baseband processing module 64 of FIG. 3. In this embodiment, the baseband processing module 64 is implemented to include a guard interval removal module 130, a fast Fourier transform (FFT) module 132, a demapping/slicing module 134, a deinterleaving module 136, a decoding module 138, and the channel estimation module 120. In this embodiment, the channel estimation module 120 includes an encoding module 140, an interleaving module 142, a mapping module 144, a channel estimation module 146, and a channel estimation update module 148. As is further shown, a frame 155, which may in accordance with IEEE 802.11a and/or IEEE 802.11.g, includes a short training sequence (STS) 157, two long training sequences (LTS) 159 161, a signal field (SIG) 163, and a plurality of data payload sections 165-169.

The baseband processing module 64 processes the sections of frame 155 sequentially. As is known, the baseband processing module 64 processes the short training sequence 157 to recognize the presence of a frame to begin the determination of whether the frame 155 is valid, and to establish initial gain settings of the radio receiver section (e.g., the LNA gain, programmable gain amplifier gain, analog-to-digital gain, et cetera).

The baseband processing module 64 then processes the long training sequences 159 and 161 to further establish the validity of frame 155 and via the guard interval (GI) removal module 130 to remove the guard intervals that separate the long training sequences 159 and 161. The fast Fourier transform module 132 converts the time domain signals representing the long training sequences into a plurality of time domain tones 150. The demapping/slicing module 134 demaps the plurality of frequency domain tones 150 to produce demapped tones 152. The interleaving module 136 deinterleaves the demapped tones 152 to produce deinterleaved data 154. The decoding module 138 decodes the deinterleaved data 154 to produce inbound decoded data 98.

For example, if the baseband processing module 64 is conFIG.d to be compliant with IEEE 802.11a and/or 802.11g, the inbound time domain baseband signals are orthogonal frequency division multiplexed (OFDM) modulated signals in the 5 GHz frequency band and/or the 2.4 GHz frequency band. The FFT module 132 converts the time domain signals into a plurality of frequency domain tones. Each of the frequency domain tones represents a sub-carrier of a channel. As is known, in the 802.11a and/or 802.11g standard, there are 48 data sub-carriers and 4 pilot sub-carriers for a total of 52 non-zero sub-carriers of a channel. The remaining 12 sub-carriers of the channel are zero to provide at least a portion of the guard interval. Each tone represents a modulated data that is in accordance with one of PBSK, QPSK, 16 QAM and/or 64 QAM. The demapping determines the particular symbol vector for the corresponding tone which is subsequently deinterleaved via the deinterleave module 136. The decoding module 138, which may be a VITERBI decoder, receives the symbol vectors representing the modulated data and decodes them accordingly to recapture the bits represented by the constellation mapped symbols.

The channel estimation module 120 essentially replicates the baseband transmit function to produce the re-mapped frequency domain tones from decoded data produced by the decoding module 138. As shown, the encoding module 140, which may be a convolutional encoder using rate 1/2, encodes the inbound decoded data bits 98 to produce re-encoded data 156. The encoding module 140 essentially is performing the inverse of the decoding module 138 and is performing the same encoding function that the transmitting wireless communication device used to encode the data that it transmitted to this particular receiver.

The interleaving module 142 interleaves the re-encoded data 156 to produce reinterleaved data 158. The mapping module 144 maps the reinterleaved data 158 to a plurality of remapped frequency domain tones 160. These functions are the inverse, or compliment, of the functions performed by the demapping/slicing module 134 and the deinterleaving module 136.

The channel estimation module 146 utilizes the plurality of remapped frequency domain tones 160 and the plurality of frequency domain tones 150 to produce a channel estimation 162 for the particular portion of the frame 155 being processed. Accordingly, a channel estimation 162 may be produced for the long training sequences 159 and 161 yielding an LTS channel estimation 171. Further, a channel estimate may be performed for the signal field 163, which is generally referred to as frame information section, to produce a service field channel estimation 173. Even further, a channel estimate may be performed for each of the plurality of data payload fields 165-169 to produce data channel estimates.

The channel estimation update module 148 receives the channel estimation 162 for the particular section of frame 155 and updates a previous channel estimation to produce an updated channel estimation 163. As one of average skill in the art will appreciate, the LTS channel estimation 171 may be derived in accordance with prior art channel estimations in wireless LAN receivers that were 802.11a and/or 802.11g compliant.

With reference to frame 155, the channel estimation module 120 generates an initial channel estimation for the frame based on the LTS channel estimation 171. As the service, or signal, field 163 is being received, the channel estimation module 120 generates a service field channel estimation 173 for the service field. The channel estimation module 120 then updates the channel estimation 163 for the frame 155 based on the initial channel estimation and the newly determined service field channel estimation 173. When the $1^{st}$ data payload is received, the channel estimation module 120 generates a corresponding channel estimation for this data payload. The previously updated channel estimation is then updated with the $1^{st}$ payload channel estimation. The channel estimation module 120 may determine a corresponding channel estimation for each data payload received and update the current channel estimation 163 accordingly. Alternatively, the channel estimation module 120 may only utilize a set of the data payload sections to determine the updating of the channel estimation 163. Which data payloads to use may be predetermined (for example, use every $4^{th}$ data payload) or may be based on power of the corresponding data payload where the energy level needs to exceed a threshold to be used for an updating of the channel estimation.

As an example of the operational of the channel estimation module 146 and the channel estimation update module 148, let the received FFT output on the $K^{th}$ tone be:

$$Y_k = Z_k H_k + V_k$$

Dropping the subscript k for any tone, the equation can be rewritten as:

$$Y = ZH + V \approx CN(0, \sigma^2)$$

where Y is the received frame information section and/or received payload section, H is the corresponding channel estimation, V represents a noise component of the received frame information section and/or the received payload section, and Z represents the plurality of remapped frequency domain tones of the received frame information section and/or received payload section, where Z can be expressed as:

$$Z = K_{MOD} X$$
therefore:
$$Y = (Z_i + jZq)(Hi + jHq) + (Vi + jVq)$$
$$= (Z_i Hi - ZqHq) + j(ZqHi + ZiHq) + (Vi + jVq)$$

therefore:

$$Yi = ZiHi - ZqHq + Vi$$
$$Yq = ZqHi + ZiHq + Vq$$
therefore:
$$ZiYi + ZqVq - (Zi^2 + Zq^2)Hi + ZiVi + ZqVq,$$

as such the channel estimation may be expressed as:

$$\hat{H}_{DNi} = \hat{H}_i$$
$$= \frac{Z_i Y_i + Z_q V q}{Z_i^2 + Z_q^2}$$

$$\hat{H}_i = H_i + \frac{Z_i V_i + Z_q V q}{Z_i^2 + Z_q^2}$$

$$= \frac{Z_i^2 \sigma^2 + Z_q^2 \sigma^2}{(Z_i^2 + Z_q^2)^2}$$

$$= \frac{\sigma^2}{(Z_i^2 + Z_q^2)^2}$$

$$= \frac{\sigma^2}{K_{MOD}^2 (X_i^2 + X_q^2)}$$

As a further example, constellation points with high energy may be used to minimize estimation noise. For instance, consider 64 QAM, where $$K_{mod} = \frac{1}{42}$$

$$\frac{\sigma^2}{K_{MOD}^2(X_i^2 + X_q^2)} = \frac{42\sigma^2}{(X_i^2 + X_q^2)}$$

From this example, channel estimation updates are done only when the constellation energy is greater than 42. Given this premise, the following constellation coordinates would give such an energy level:

| $(X_i, X_q)$ | $X_i^2 + X_q^2$ |
|---|---|
| I1, I7 | 50 |
| I3, I7 | 58 |
| I5, I7 | 74 |
| I7, I7 | 98 |
| I5, I5 | 50 |

Figure 6:
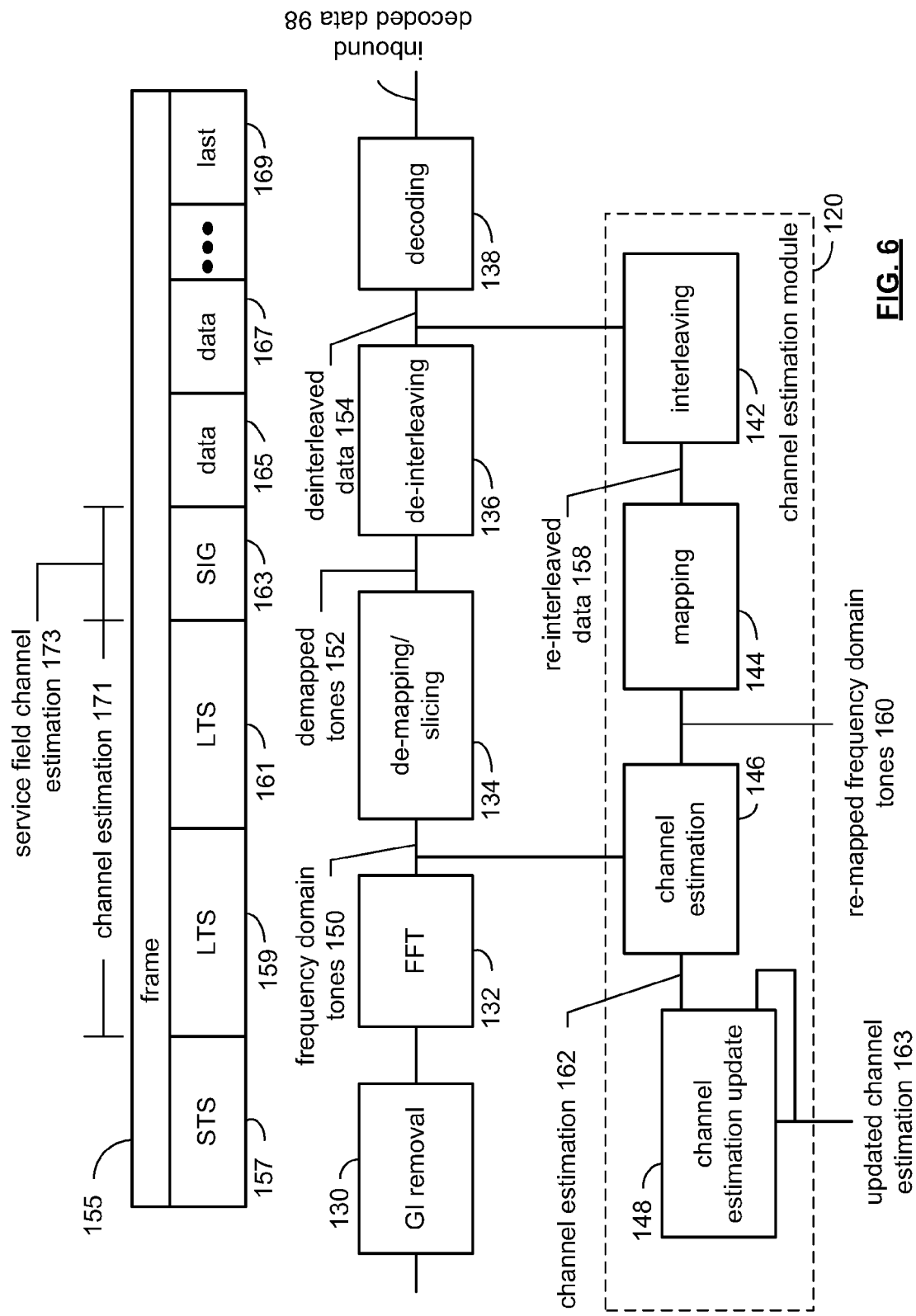
FIG. 6 is a schematic block diagram of another embodiment of the baseband processing module of the wireless communication device of FIG. 3 in accordance with the present invention.

FIG. 6 is an alternate implementation of the baseband processing module 64. In this embodiment the baseband processing module 64 includes the guard interval removal module 130, the FFT module 132, the demapping/slicing module 134, the deinterleaving module 136, the decoding module 138, and the channel estimation module 120. In this embodiment, the channel estimation module 120 includes the interleaving module 142, the mapping module 144, the channel estimation module 146 and the channel estimation update module 148. Modules 130-138 function as previously described with reference to FIG. 5 to convert inbound time domain baseband signals into inbound decoded data 98.

In this embodiment, the channel estimation module 120 receives the deinterleaved data 154 from module 136 via the interleaving module 142. The interleaving module 142 reinterleaves the data to produce reinterleaved data 158. The mapping module 144 maps the reinterleaved data 158 to a plurality of remapped frequency domain tones 160. The channel estimation module 146 and channel estimation update module 148 function as previously described with reference to FIG. 5 to produce the updated channel estimate 163.

Figure 7:
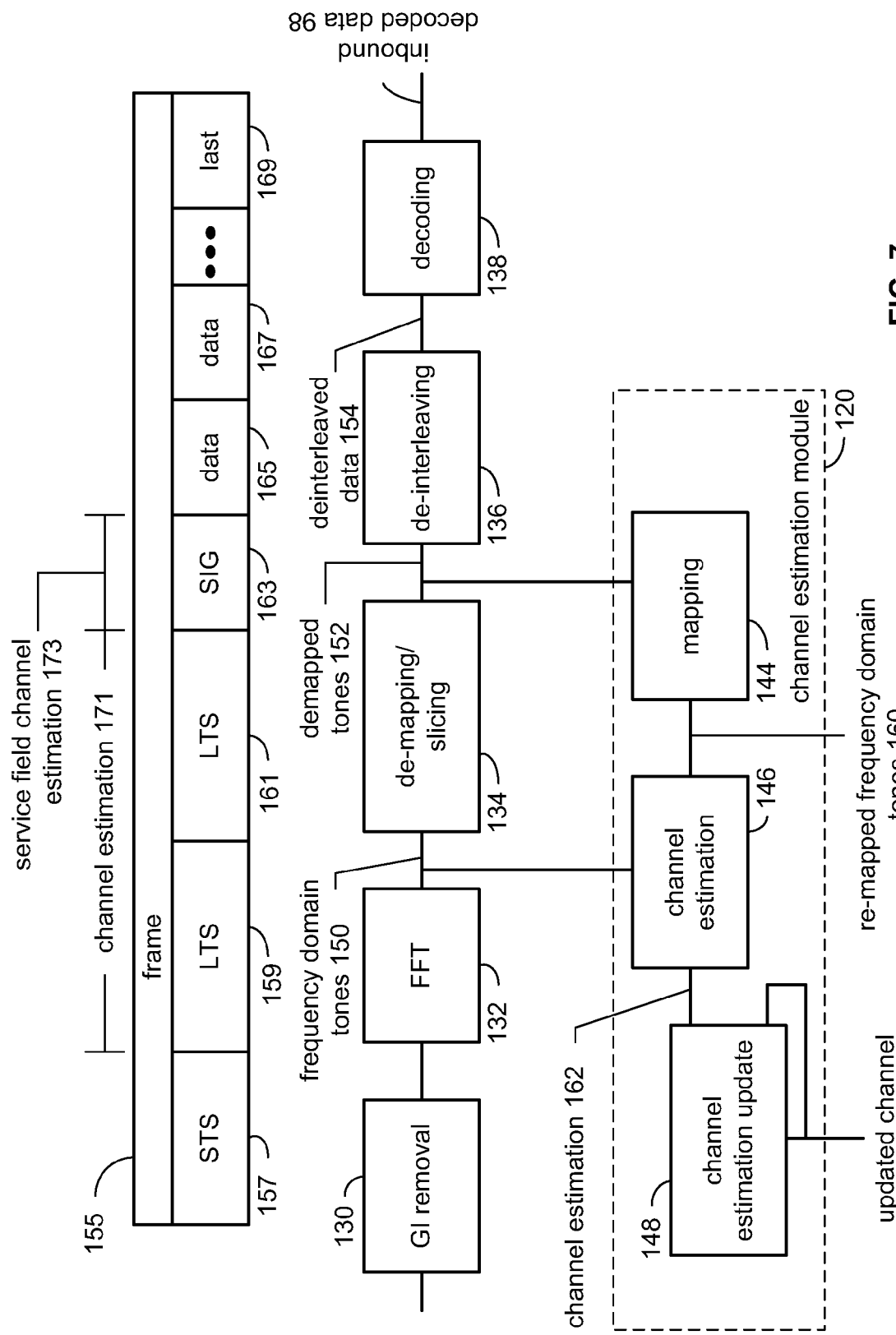
FIG. 7 is a schematic block diagram of yet another embodiment of the baseband processing module of the wireless communication device of FIG. 3 in accordance with the present invention.

FIG. 7 is a schematic block diagram of yet another embodiment of the baseband processing module 64. In this embodiment, the baseband processing module 64 is conFIG.d to include the guard interval removal module 130, the FFT module 132, the demapping/slicing module 134, the deinterleaving module 136, the decoded module 138, and the channel estimation module 120. In this embodiment, the channel estimation module 120 includes the mapping module 144, the channel estimation module 146 and the channel estimation update module 148. Modules 130-138 operate as previously described with reference to FIG. 5 to convert inbound time domain baseband signals into inbound decoded data 98.

In this embodiment, the channel estimation module 120 receives the demapped tones 152 via the mapping module 144. The mapping module 144 maps the demapped tones 152 to tones of the OFDM modulation to produce a plurality of remapped frequency domain tones 160. The channel estimation module 146 and channel estimation update module 148 function as previously described with reference to FIG. 5 to produce the updated channel estimation 163.

Figure 8:
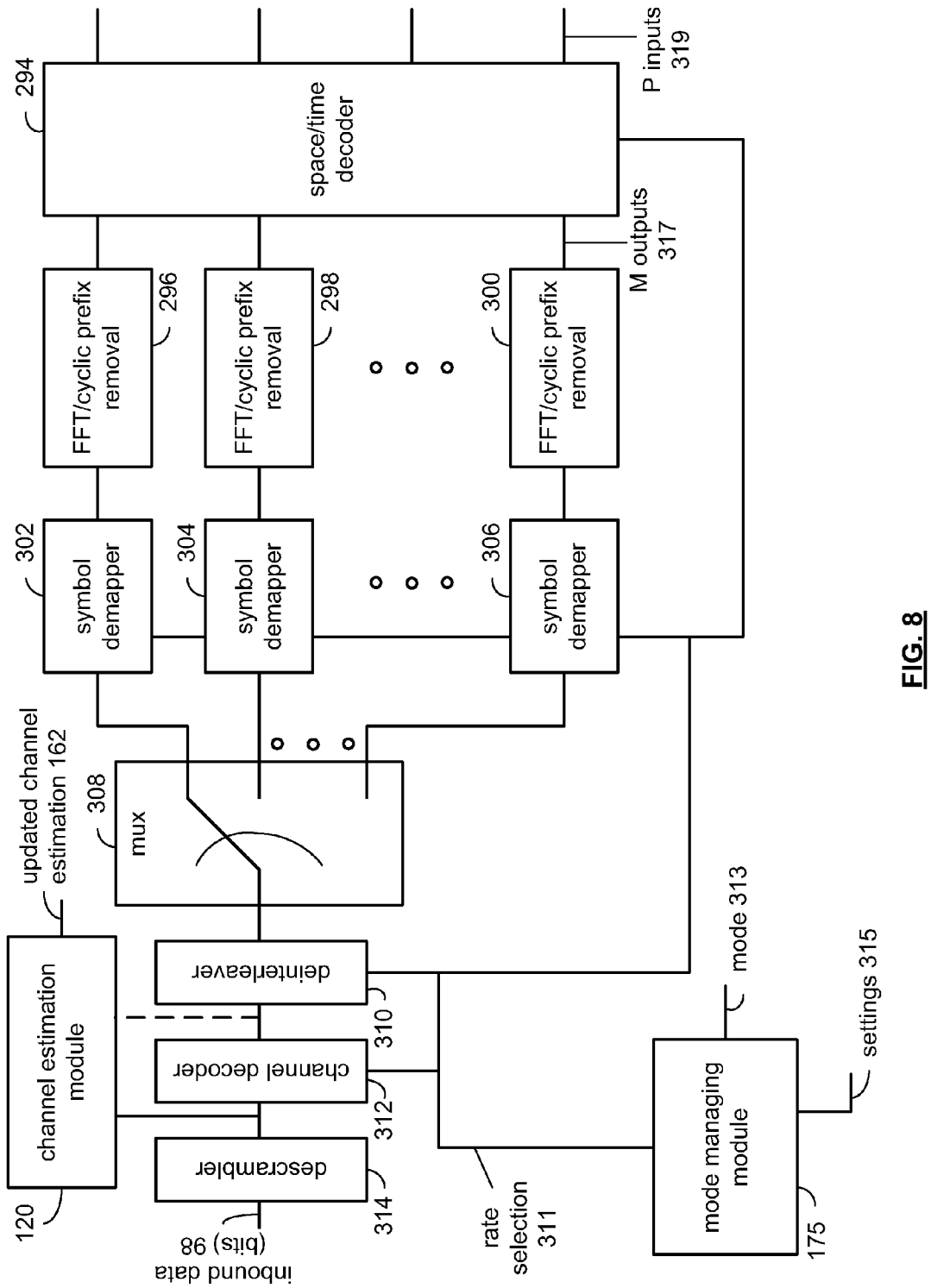
FIG. 8 is a schematic block diagram of an embodiment of the baseband processing module of the wireless communication device of FIG. 2 in accordance with the present invention.

FIG. 8 illustrates the baseband processing of a receiver in accordance with the wireless communication device of FIG. 2. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, a descramble module 314, and the channel estimation module 120. The baseband processing module may further include a mode managing module 175 to produce settings 315 and a rate select 311 from mode of operation selection input 313. The space/time decoding module 294 receives P-inputs 319 from the receiver paths and produces M-output paths 317. In an embodiment, the space/time decoding module 294 multiples the input symbols of each path with a decoding matrix that has the form of $$\begin{bmatrix} C_1 & C_2 & C_3 & \ldots & C_{2M-1} \\ -C_2^* & -C_2^* & C_4 & \ldots & C_{2M} \end{bmatrix}$$

Note that the rows of the decoding matrix correspond to the number of input paths and the columns correspond to the number of output paths. Note that the number of M output 317 paths of the space and time decoding may equal the number of P-input 319 paths of the space and time decoding or the number of input paths P may equal M+1 paths.

The FFT/cyclic prefix removal modules 296-300 converts the M streams of symbols from time domain symbols to frequency domain symbols to produce M streams of frequency domain symbols. In one embodiment, the prefix removal function removals inter-symbol interference based on a prefix. Note that, in general, a 64-point FFT will be used for 20 MHz channels and 128-point FFT will be used for 40 MHz channels.

The symbol demapping modules 302-306 convert the frequency domain symbols into bit streams of data. In an embodiment, each symbol demapping module maps quadrature amplitude modulated QAM symbols (e.g., BPSK, QPSK, 16 QAM, 64 QAM, 256 QAM, et cetera) into a bit stream of data. Note that for IEEE 802.11(a) backward compatibility, double gray coding may be used. The multiplexer 308 combines the demapped symbol streams into a single path. The deinterleaver 310 deinterleaves the single path.

The iterative decoder 312, which is described in greater detail in co-pending patent application entitled WLAN RECEIVER HAVING AN ITERATIVE DECODER having a Ser. No. 10/876,230 and a provisional filing date of Feb. 20, 2004, decodes the deinterleaved data to produce decoded data. The descrambler 314 descrambles the decoded data to produce the inbound data 98. In one embodiment, the descrambler 314 removes (in GF2) a pseudo random sequence from the decoded data. A pseudo random sequence may be generated from a feedback shift register with the generator polynomial of $S(x)=x^7+x^4+1$ to produce scrambled data.

The channel estimation module 120 may be coupled to the output of the deinterleaving module 310 to receive deinterleaved data or it may be coupled to the output of the channel decoder 312 to receive decoded data. If the channel estimation module 120 is coupled to receive the decoded data it functions as previously described with reference to FIG. 5. If the channel estimation module 120 receives the deinterleaved data, it functions as previously described with reference to FIG. 6.

Figure 9:
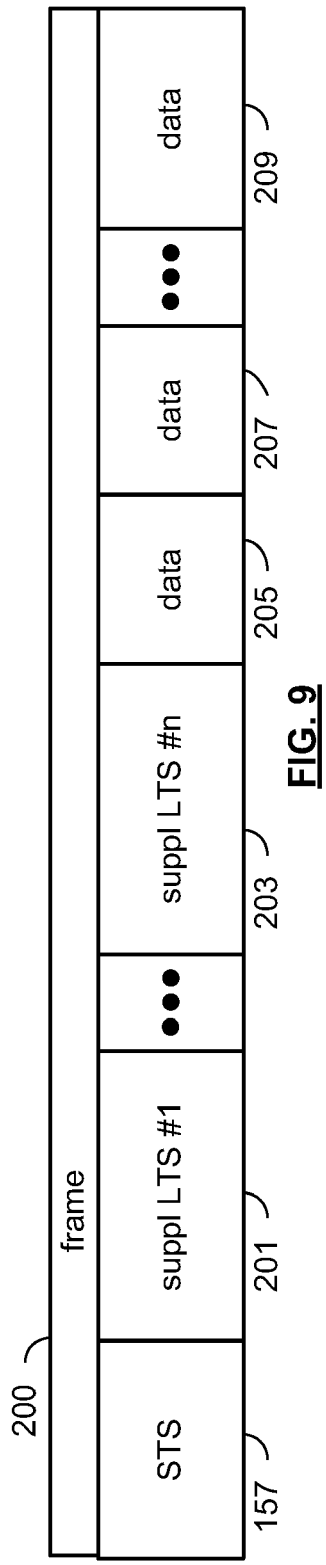
FIGS. 9-11 are diagrams of various frame formats that may be processed by the baseband processing module of FIG. 8.

FIG. 9 illustrates a frame 200 that may be constructed in accordance with IEEE 802.11n when only 802.11n compliant devices are within a proximal area for a wireless communication. As shown, frame 200 includes a short training sequence (STS) 157, a plurality of supplemental long training sequences (suppl LTS) 201-203, and a plurality of data payload sections 205-207. For this type of frame, the channel estimation module 120 of FIG. 8 will initially generate the channel estimation based on the LTS channel estimation as previously described with reference to FIG. 5. The channel estimation module 120 will then update the channel estimation for each channel estimation it generates for a data payload section. As shown, the 1$^{st}$ data payload has a corresponding channel estimate that is used to update the LTS channel estimate to produce the updated channel estimate. The next data payload has a corresponding channel estimate produced for it and the corresponding channel estimate is used to update the previously updated channel estimate.

Figure 10:
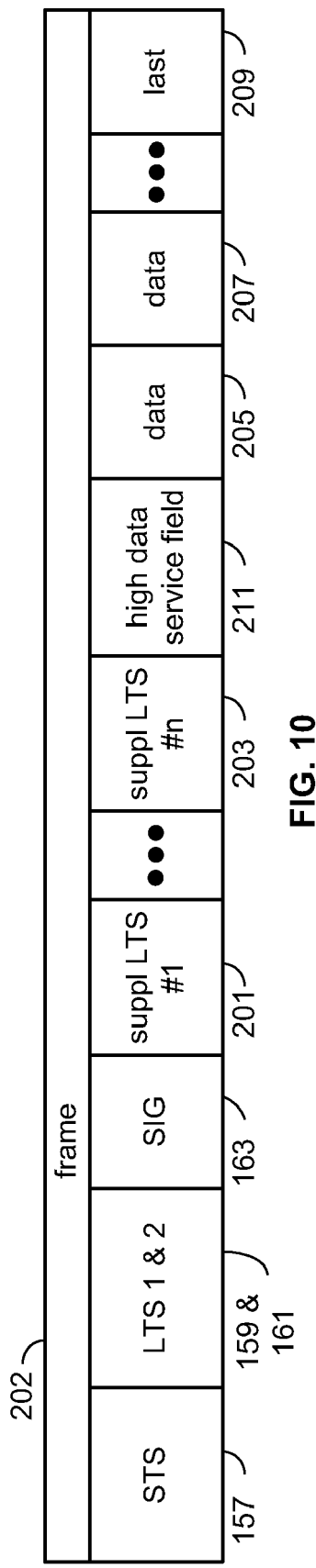

FIG. 10 illustrates a frame 202 that may be in accordance with IEEE 802.11n where the communication area includes 802.11n, 802.11a and/or 802.11g devices. In this instance, the frame 202 includes the short training sequence (STS) 157, long training sequences (LTS) 159 & 161 in accordance with the 802.11a and/or 802.11g standard, a service field (SIG) 163 in accordance with the 802.11a and/or 802.11g standard, supplemental long training sequences (suppl LTS) 201-203, a high data service field 211, and a plurality of data payload sections 205-209. Frame 202, as illustrated, includes two frame information fields: the service field 163 and the high data service field 211.

The channel estimation module 120 of FIG. 8 generates the channel estimation by first determining the LTS channel estimation and then updating it with a channel estimation corresponding to the service field. The channel estimation module then determines a channel estimate for the supplemental long training sequences and uses that to update the previously updated channel estimate. The updating of the channel estimate continues for the high data service field 211 and one or more of the data payload fields 205-209.

Figure 11:
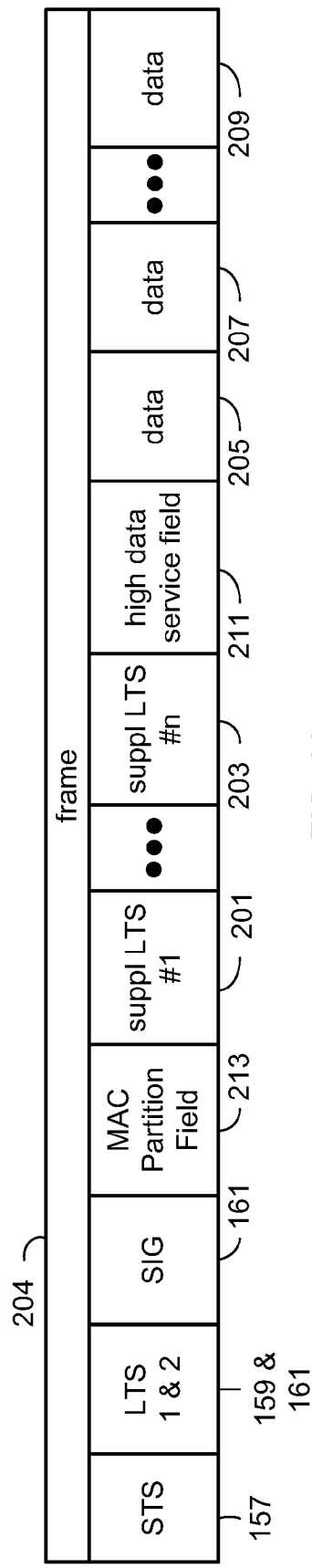

FIG. 11 is another illustration of a frame 204 that may be compliant with IEEE 802.11n for communications that include 802.11n devices, 802.11a devices, 802.11b devices and/or 802.11g devices. In this example, the frame 204 includes a short training sequence (STS) 157, the legacy long training sequences 1 and 2 (LTS) 159 & 161, the legacy service field (SIG) 163, a MAC partitioning field 213, supplemental long training sequences (suppl LTS) 201-203, the high data service field 211 and a plurality of data payload fields 205-209. The channel estimation module 120 of FIG. 8 determines the initial channel estimate by utilizing the LTS channel estimate. The channel estimation module 120 then determines a channel estimate for each field and/or section of frame 204 and uses that channel estimate to update the previously updated channel estimate. In this illustration, frame 204 includes the legacy service field 163, the MAC partitioning field 213 and the high data service field 211 as frame information sections.

Figure 12A:
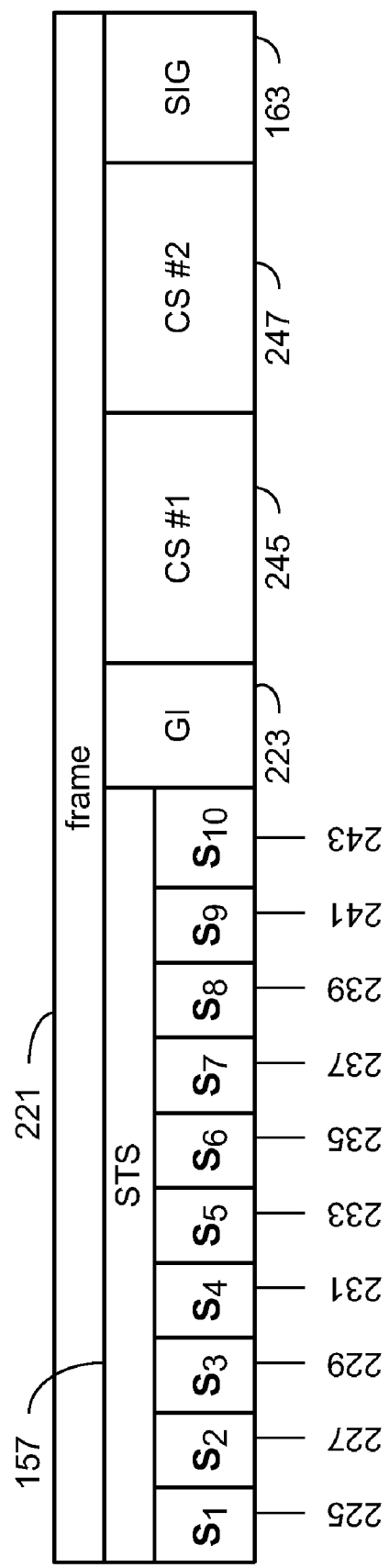
FIG. 12A is a diagram of a frame format that may be processed by the baseband processing modules of FIGS. 7 and 8.

FIG. 12A is a diagram of a portion of a frame 221 that may be processed by the baseband processing modules of FIGS. 7 and 8. The frame 221 includes a short training sequence (STS) 157, a guard interval (GI) 223, two channel soundings (CS) 245 and 247, and a signal field (SIG) 163. In one embodiment, the portion of the frame 221 is 20 microseconds (μS) in duration where the STS consumes 4 μS, the GI consumes 1.6 μS, each of the CSs consumes 3.2 μS, and the signal field consumes 4 μS. Within the STS, each of the symbols consumes 0.8 μS.

The STS 157 includes ten short training symbols ($s_1$-$s_{10}$) 225-243. The channel soundings 245 and 247 (e.g., long training in IEEE 802.11a) of the frame 221 satisfy 2 criteria:
1. Legacy (802.11a/g) stations can use it to decode the SIGNAL field and get the frame length to set the clear channel assessment (CCA) indication.
2. Next generation 802.11n stations can use it for (part of) the MIMO channel estimate.

With these criteria satisfied, the channel estimation error is minimized for a given amount of overhead and the sequence is energy-efficient. For unchanged SIGNAL field decoding at legacy stations, linear weighting of the existing long training and SIGNAL symbols at the transmitter antenna inputs is used, where the same weighting is applied to the first two long training symbols and the legacy SIGNAL field for decoding by legacy stations.

Figure 12B:
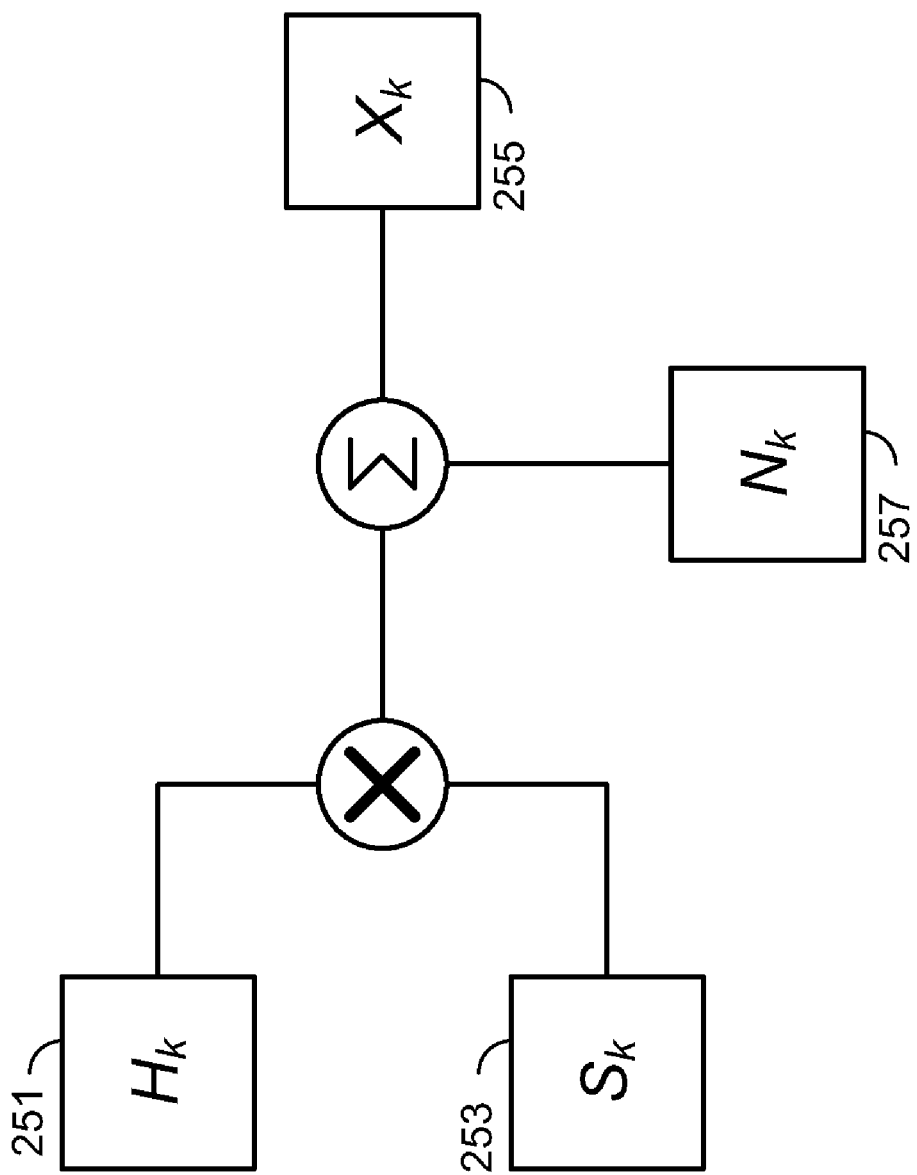
FIG. 12B is a received signal model of the signal of the frame format of FIG. 12A.

FIG. 12B is a diagram of a received signal model of the signal of the frame format of FIG. 12A. As shown the received signal ($X_k$) 255 is comprises of the transmitted channel sounding signal ($S_k$) 253, a channel estimate ($H_k$) 251, and a noise matrix ($N_k$) 257. In particular, the received signal $X_k = S_k * H_k + N_k$, where $S_k$, $H_k$, and $N_k$ are matrixes. In one embodiment, the channel estimate $H_k$ 251 and the transmitted channel sounding signal $S_k$ 253 may be in the form of:

$$X_k = S_k \cdot H_k + N_k$$

$$H_k = \begin{pmatrix} h_k^{(0,0)} & h_k^{(0,1)} & \ldots & h_k^{(0,N-1)} \\ h_k^{(1,0)} & h_k^{(1,1)} & \ldots & h_k^{(1,N-1)} \\ \vdots & \vdots & \ddots & \vdots \\ h_k^{(M-1,0)} & h_k^{(M-1,1)} & \ldots & h_k^{(M-1,N-1)} \end{pmatrix}$$

$$S_k = \begin{pmatrix} s_k^{(0,0)} & s_k^{(0,1)} & \ldots & s_k^{(0,M-1)} \\ s_k^{(1,0)} & s_k^{(1,1)} & \ldots & s_k^{(1,M-1)} \\ \vdots & \vdots & \ddots & \vdots \\ s_k^{(L-1,0)} & s_k^{(L-1,1)} & \ldots & s_k^{(L-1,M-1)} \end{pmatrix}$$

From this signal model, the zero-forcing (ZF) MIMO channel estimate is then computed as:

$$\hat{H}_k = (S_k^H \cdot S_k)^{-1} \cdot S_k^H \cdot X_k$$
$$= \frac{1}{M} \cdot S_k^H \cdot X_k$$

If the long training symbol sequence is defined well, $S_k$ ends up being a real scalar times a unitary matrix). In such case, the minimum mean-square (MMSE) channel estimate is computed as:

$$\hat{H}_k = (S_k^H \cdot S_k + \sigma_\eta^2 \cdot I)^{-1} \cdot S_k^H \cdot X_k$$
$$= \rho \cdot S_k^H \cdot X_k$$
$$\rho = \frac{1}{M + \sigma_\eta^2}$$

where, for simplicity, $n_k$ is assumed to be individually identically distributed (i.i.d.) Gaussian and chosen to make a "good long training choice." Note that there is essentially no reason to perform MMSE vs. Zero Forcing (ZF) estimation for the sequences since we have S is carefully chosen.

Figure 13:
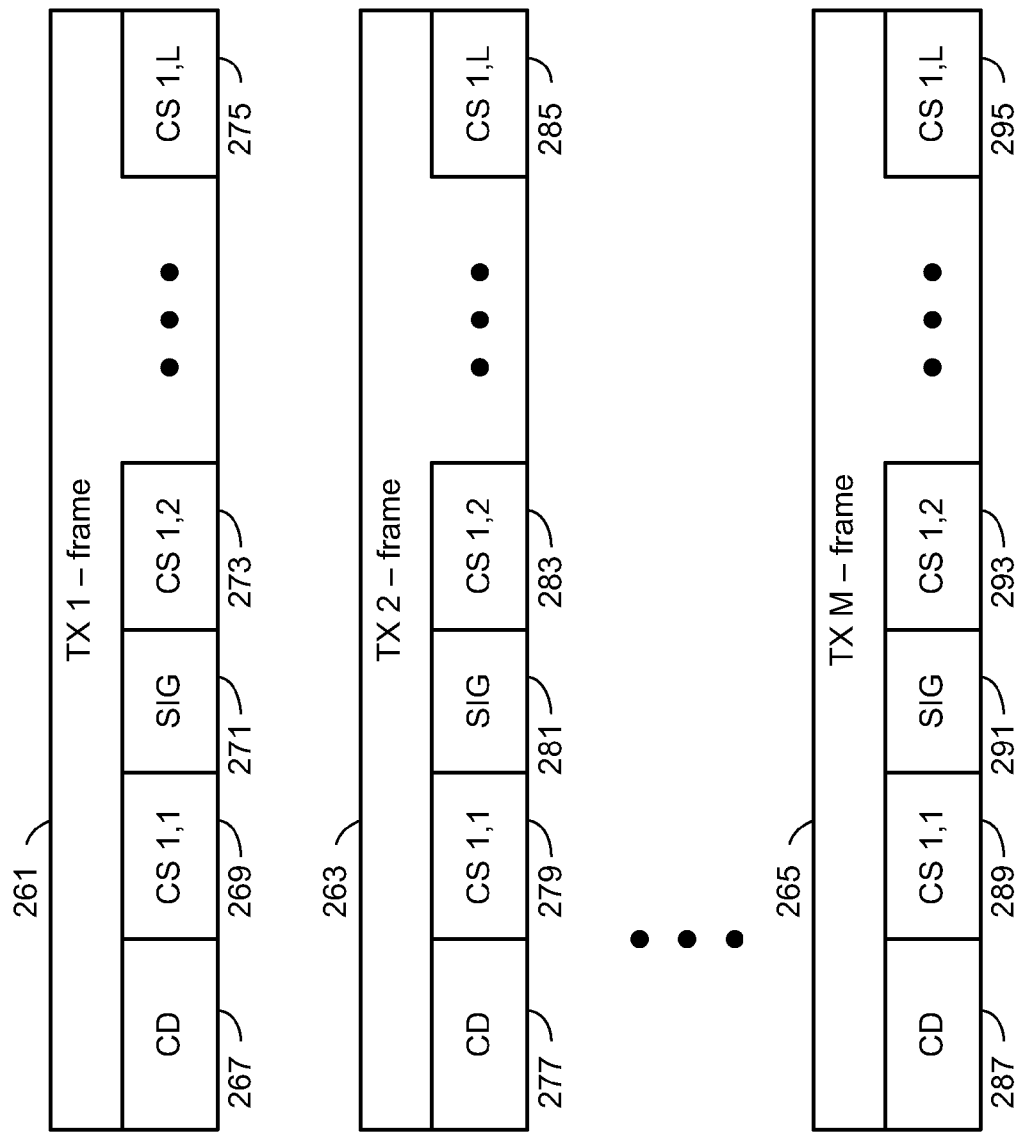
FIG. 13 is a diagram illustrating the transmission of a preamble on a plurality of antennas that is compatible with the baseband processing modules of both FIGS. 7 and 8.

FIG. 13 is a diagram illustrating the transmission of a plurality of preambles 261-265 on a plurality of antennas (TX 1 through TX M) that is compatible with the baseband processing modules of both FIGS. 7 and 8. In one embodiment, each preamble 261-265 includes a carrier detect (CD) field 267, 277, 287, a first channel sounding (CS M,1) 269, 279, and 289, a signal field (SIG) 271, 281, 291, and L−1 remaining channel soundings (CS M,L). In such an embodiment, the channel detect CD 267, 277, 287, the first channel soundings 269, 279, 289, and the signal field 271, 281, 291 may correspond to a short training sequence, a long training sequence, and a signal field of a legacy wireless protocol (e.g., IEEE 802.11a, b, and/or g).

According to this teaching of the present invention, preamble energy is transmitted from an IEEE 802.11n STA or AP on all tones, or nearly all of the tones, on all antennas, or nearly all of the antennas, for all L sounding sequences. The energy sent from each of M antennas during each of L soundings is $2 s^2/M$ when L=M. The total energy for matrix channel estimation is $2 Ms^2$ when L=M. Thus, the transmitted energy is M times more energy sent than when only a single tone is transmitted at any time.

Figure 14:
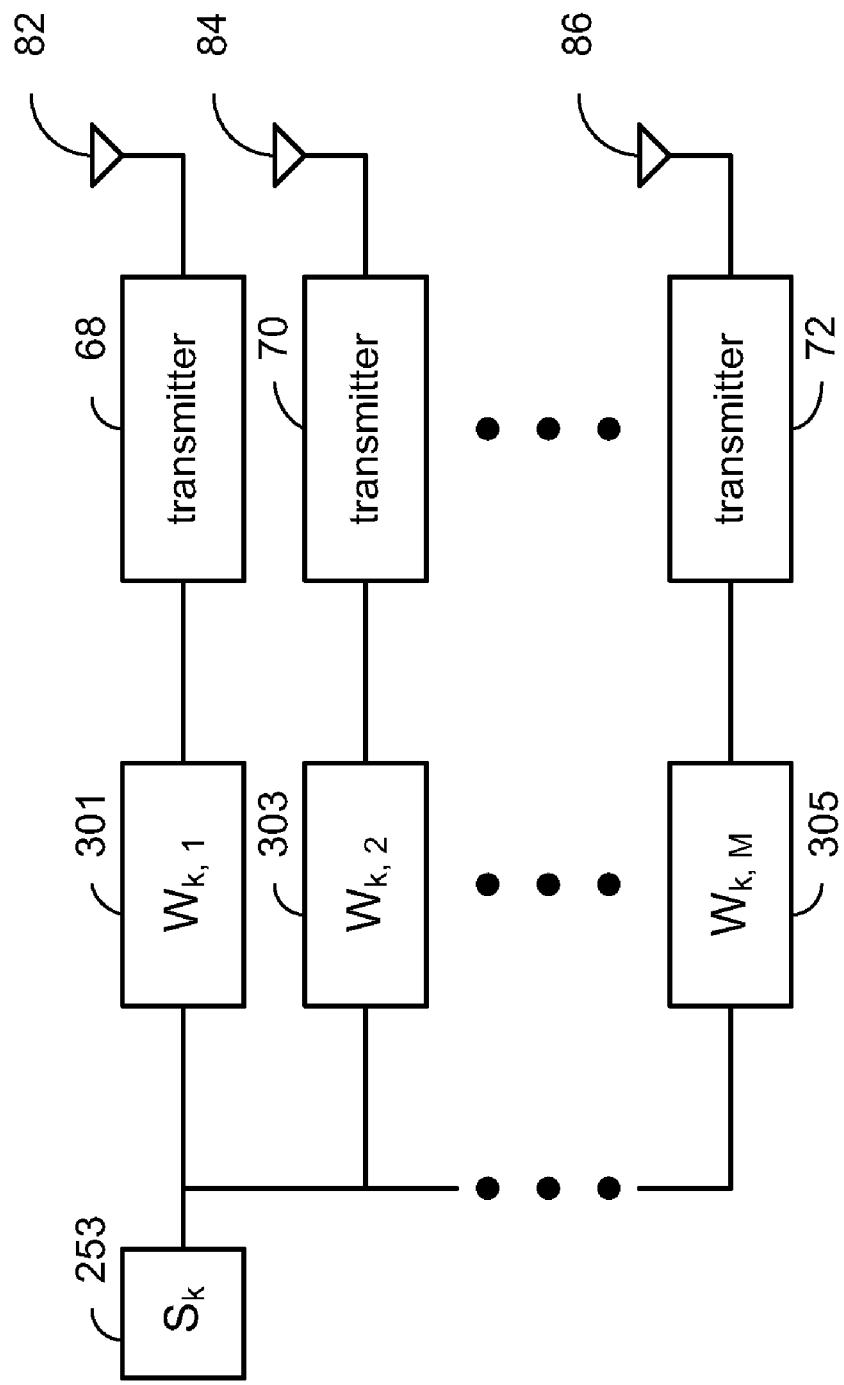
FIG. 14 is a diagram illustrating a transmission model of the frame format of FIG. 12A.

FIG. 14 is a diagram illustrating a transmission model of the frame format of FIG. 12A. For this transmission format, in order to satisfy backwards compatibility issues and also to satisfy the requirements of the next generation channel estimation requirements, W is chosen such that W and $W^{-1}$ are simple to implement. Further, any beam forming issues from MIMO transmitters (next generation devices) by $[w_{11} \ldots w_{1M}]$ should be well-received by legacy 802.11a/g devices.

In this embodiment, a channel sounding ($S_k$) 253 is multiplied by a plurality of weighting factors ($W_{k, m}$) 301-303, wherein k corresponds to the channel sounding number, which ranges from 1 to 1, and m corresponds to the number of transmit antennas 82-86. The resulting weighted channel soundings are converted to RF signals via the transmitters 68-72 and subsequently transmitted via the antennas 82-86. In such an embodiment, a weighting factor matrix may be as follows:

$$\begin{bmatrix} w_{11} & w_{12} & \ldots & w_{1M} \\ w_{21} & w_{22} & \ldots & w_{2M} \\ \vdots & \vdots & \ddots & \vdots \\ w_{L1} & w_{L2} & \ldots & w_{LM} \end{bmatrix} S_k$$

With transmissions occurring on all antennas at all times, nulls may be formed. The nulls may be compensated for by selecting a weight sequence that acts as a beam former such that the nulls are steered in particular directions. For example, for the case of the vector $w_1=[1 \ 1]$ (one row of the previous slide's W matrix for a 2 TX case), nulls would be steered in the directions −90° and +90°. Thus, certain directions are disadvantaged vs. others at a single-input receiver of a legacy WLAN device.

According to the present invention, a different complex weight is applied to each subcarrier on M−1 of the transmit antennas. This forms a different beam pattern on each subcarrier and results in less power and capacity loss in the worst directions.

Figure 15:
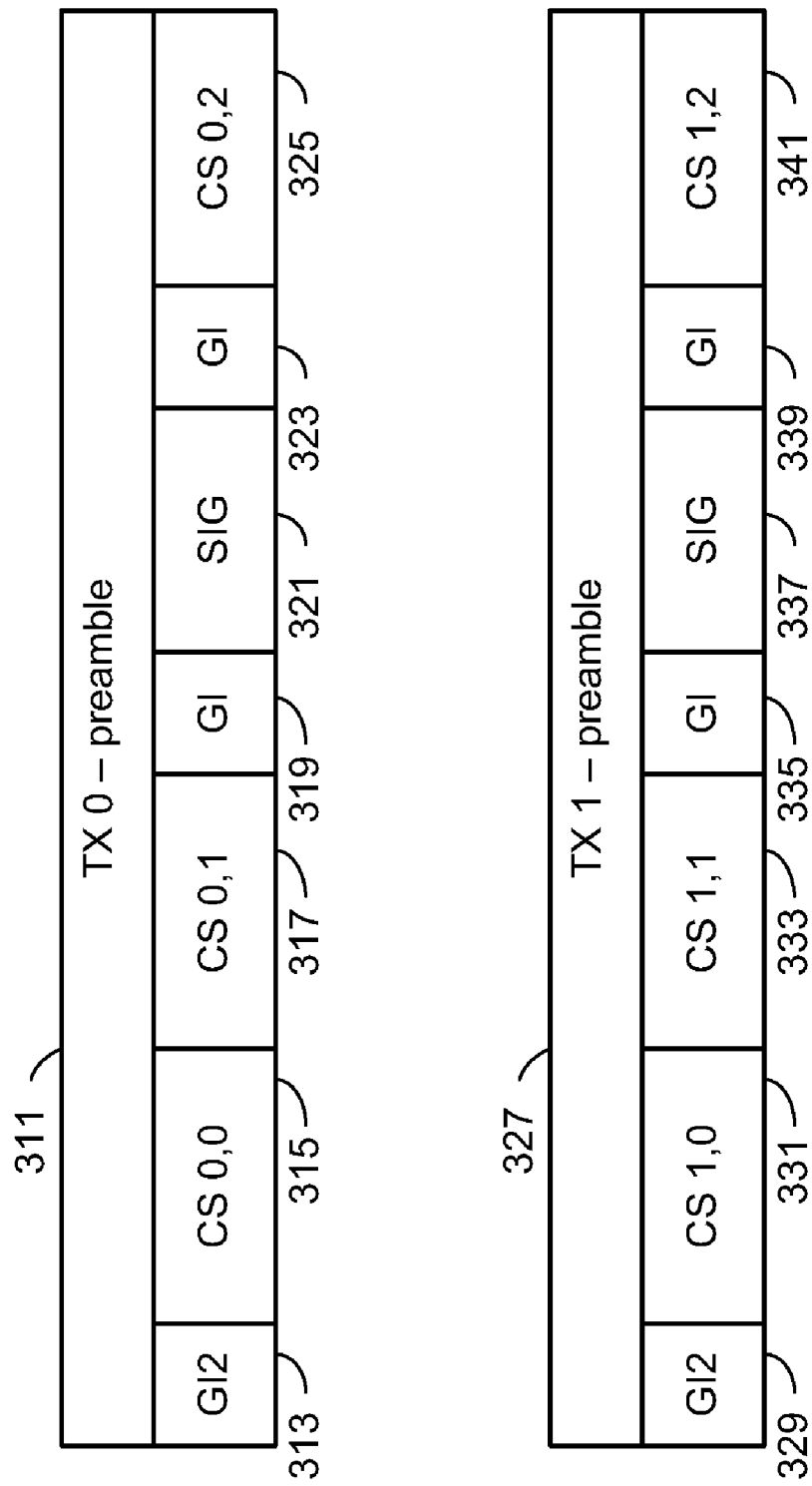
FIG. 15 is a diagram illustrating the manner in which a preamble of the frame format of FIG. 12A is formed for a generalized next generation MIMO transmitter and particularly for a two antenna next generation MIMO transmitter.

FIG. 15 is a diagram illustrating the manner in which a preamble of the frame format of FIG. 12A is formed for a generalized next generation MIMO transmitter and particularly for a two antenna next generation MIMO transmitter. In this illustration, two preambles are generated: one for each active antenna. The first preamble 311, which is transmitted by the first antenna, includes a double guard interval (GI2) 313, a first channel sounding (CS 0,0) 315, a second channel sounding (CS 0,1) 317, a guard interval (GI) 319, a signal field (SIG) 321, another guard interval (GI) 323, and a third channel sounding (CS 0,2) 325. The second preamble 327, which is transmitted by the second antenna, includes a double guard interval (GI2) 329, a first channel sounding (CS 1,0) 331, a second channel sounding (CS 1,1) 333, a guard interval (GI) 335, a signal field (SIG) 337, another guard interval (GI) 339, and a third channel sounding (CS 1,2) 341.

In this embodiment, the following may be used for the various channel soundings:

$$s_{01}=s_{00}$$

$$s_{10,k}=-s_{00,k} \cdot e^{i \cdot \theta_k}$$

$$s_{11}=s_{10}$$

$$s_{02}=s_{00}$$

$$s_{10,k}=s_{00,k} \cdot e^{i \cdot \theta_k}$$

From these channel soundings, the weighting factor may be applied as follows:

$$S_k = \begin{bmatrix} s_{10,k} & s_{11,k} \\ s_{20,k} & s_{21,k} \end{bmatrix}$$

$$= s_{00,k} \cdot \begin{bmatrix} 1 & -1 \\ 1 & 1 \end{bmatrix} \cdot \begin{bmatrix} 1 & 0 \\ 0 & e^{i \theta_k} \end{bmatrix}$$

$$= \begin{bmatrix} s_{00,k} & -s_{00,k} \cdot e^{i \cdot \theta_k} \\ s_{00,k} & s_{00,k} \cdot e^{i \cdot \theta_k} \end{bmatrix}$$

where the first digital of the subscript of a channel sounding corresponds to the number of antennas, the second digit corresponds to the number of symbols, and the k corresponds to the number of channel soundings. For example, $S_{10,k}$ corresponds to the first symbol transmitted on the first antenna for the kth channel sounding.

To obtain a different beam pattern for each subcarrier, the following is applied:

$$\theta_k = \pi \cdot k/6, k$$

$$= -\frac{N_{subcarriers}}{2} \ldots \frac{N_{subcarriers}}{2}$$

Figure 16:
FIG. 16 is a diagram illustrating the manner in which a preamble of the frame format of FIG. 12A is formed for a three antenna next generation MIMO transmitter.

FIG. 16 is a diagram illustrating the manner in which a preamble of the frame format of FIG. 12A is formed for a three antenna next generation MIMO transmitter. In this illustration, three preambles are generated: one for each active antenna. The first preamble 351, which is transmitted by the first antenna, includes a double guard interval (GI2) 353, a first channel sounding (CS 0,0) 355, a second channel sounding (CS 0,1) 357, a guard interval (GI) 359, a signal field (SIG) 361, another guard interval (GI) 363, a third channel sounding (CS 0,2) 365, a third guard interval (GI) 367, and a fourth channel sounding (CS 0,3) 369. The second preamble 371, which is transmitted by the second antenna, includes a double guard interval (GI2) 373, a first channel sounding (CS 1,0) 375, a second channel sounding (CS 1,1) 377, a guard interval (GI) 379, a signal field (SIG) 381, another guard interval (GI) 383, a third channel sounding (CS 1,2) 385, a third guard interval (GI) 387, and a fourth channel sounding (CS 1,3) 389. The third preamble 391, which is transmitted by the third antenna, includes a double guard interval (GI2) 393, a first channel sounding (CS 2,0) 395, a second channel sounding (CS 2,1) 397, a guard interval (GI) 399, a signal field (SIG) 401, another guard interval (GI) 403, a third channel sounding (CS 2,2) 405, a third guard interval (GI) 407, and a fourth channel sounding (CS 2,3) 409.

For the various channel soundings, the weighting factor matrix may be applied as follows:

$$S_k = \begin{bmatrix} s_{10,k} & s_{11,k} & s_{12,k} \\ s_{20,k} & s_{21,k} & s_{22,k} \\ s_{30,k} & s_{31,k} & s_{32,k} \end{bmatrix}$$

$$= \begin{bmatrix} s_{00,k} & s_{00,k} \cdot e^{i \cdot \theta_k} & s_{00,k} \cdot e^{i \cdot \phi_k} \\ s_{00,k} & s_{00,k} \cdot e^{i\left(\theta_k - \frac{4\pi}{3}\right)} & s_{00,k} \cdot e^{i\left(\phi_k - \frac{2\pi}{3}\right)} \\ s_{00,k} & s_{00,k} \cdot e^{i\left(\theta_k - \frac{2\pi}{3}\right)} & s_{00,k} \cdot e^{i\left(\phi_k - \frac{4\pi}{3}\right)} \end{bmatrix}$$

To obtain a different beam pattern for each subcarrier, the following is applied:

$\theta_k = \pi \cdot k / 6$ $\phi_k = \pi \cdot (k+4)/6$

Figure 17:
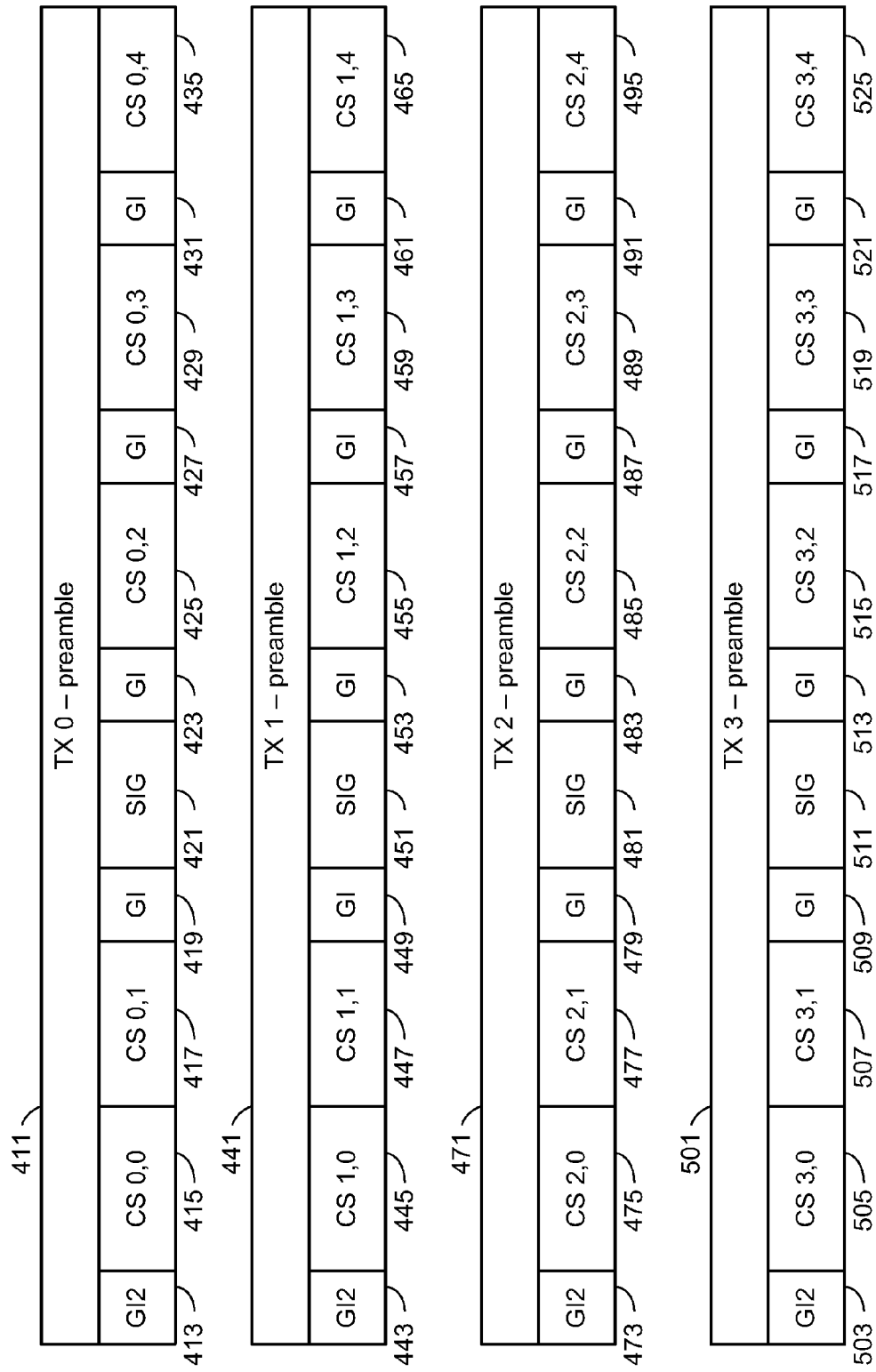
FIG. 17 is a diagram illustrating the manner in which a preamble of the frame format of FIG. 12A is formed for a four antenna next generation MIMO transmitter.

FIG. 17 is a diagram illustrating the manner in which a preamble of the frame format of FIG. 12A is formed for a four antenna next generation MIMO transmitter. In this illustration, four preambles are generated: one for each active antenna. The first preamble 411, which is transmitted by the first antenna, includes a double guard interval (GI2) 413, a first channel sounding (CS 0,0) 415, a second channel sounding (CS 0,1) 417, a guard interval (GI) 419, a signal field (SIG) 421, another guard interval (GI) 423, a third channel sounding (CS 0,2) 425, a third guard interval (GI) 427, a fourth channel sounding (CS 0,3) 429, a guard interval (GI) 431, and a fifth channel sounding (CS 0,4) 435. The second preamble 441, which is transmitted by the second antenna, includes a double guard interval (GI2) 443, a first channel sounding (CS 1,0) 445, a second channel sounding (CS 1,1) 447, a guard interval (GI) 449, a signal field (SIG) 451, another guard interval (GI) 453, a third channel sounding (CS 1,2) 455, a third guard interval (GI) 457, a fourth channel sounding (CS 1,3) 459, a guard interval (GI) 461, and a fifth channel sounding (CS 1,4) 465. The third preamble 471, which is transmitted by the third antenna, includes a double guard interval (GI2) 473, a first channel sounding (CS 2,0) 475, a second channel sounding (CS 2,1) 477, a guard interval (GI) 479, a signal field (SIG) 481, another guard interval (GI) 483, a third channel sounding (CS 2,2) 485, a third guard interval (GI) 487, a fourth channel sounding (CS 2,3) 489, a guard interval (GI) 491, and a fifth channel sounding (CS 2,4) 495. The fourth preamble 501, which is transmitted by the fourth antenna, includes a double guard interval (GI2) 503, a first channel sounding (CS 3,0) 505, a second channel sounding (CS 3,1) 507, a guard interval (GI) 509, a signal field (SIG) 511, another guard interval (GI) 513, a third channel sounding (CS 3,2) 515, a third guard interval (GI) 517, a fourth channel sounding (CS 3,3) 519, a guard interval (GI) 521, and a fifth channel sounding (CS 3,4) 525.

For the embodiment of FIG. 17, $\theta_k = \pi \cdot k / 6$ $\phi_k = \pi \cdot (k+2)/6$ $\psi_k = \pi \cdot (k+4)/6$ With the operations of FIGS. 15-17, $\theta_k$, $\phi_k$, and $\psi_k$ are set to form a different beam pattern on each subcarrier. Because more energy is transmitted, better channel estimates may be determined by next generation 802.11n devices. Further, with this signal format, simple Zero Forcing (ZF) or MMSE channel estimation may be performed by the next generation receivers.

Such channel estimation operations may be performed by applying the following matrices for the two antenna, three antenna, and four antenna cases, respectively.

$$W_T = \begin{bmatrix} +1 & -1 \\ +1 & +1 \end{bmatrix} \Rightarrow W_T^{-1}$$

$$= \frac{1}{2}\begin{bmatrix} +1 & +1 \\ -1 & +1 \end{bmatrix}$$

$$W_T = \begin{pmatrix} 1 & 1 & 1 \\ 1 & \frac{-1 - i \cdot \sqrt{3}}{2} & \frac{-1 + i \cdot \sqrt{3}}{2} \\ 1 & \frac{-1 + i \cdot \sqrt{3}}{2} & \frac{-1 - i \cdot \sqrt{3}}{2} \end{pmatrix} \Rightarrow W_T^{-1}$$

$$= \frac{1}{3} \cdot \begin{pmatrix} 1 & 1 & 1 \\ 1 & \frac{-1 + i \cdot \sqrt{3}}{2} & \frac{-1 - i \cdot \sqrt{3}}{2} \\ 1 & \frac{-1 - i \cdot \sqrt{3}}{2} & \frac{-1 + i \cdot \sqrt{3}}{2} \end{pmatrix}$$

$$W_T = \begin{bmatrix} -1 & +1 & +1 & +1 \\ +1 & -1 & +1 & +1 \\ +1 & +1 & -1 & +1 \\ +1 & +1 & +1 & -1 \end{bmatrix} \Rightarrow W_T^{-1}$$

$$= \frac{1}{4}\begin{bmatrix} -1 & +1 & +1 & +1 \\ +1 & -1 & +1 & +1 \\ +1 & +1 & -1 & +1 \\ +1 & +1 & +1 & -1 \end{bmatrix}$$

Using these techniques, in a first embodiment, the channel may be estimated with prior knowledge of the per-subcarrier beamforming coefficients and then these coefficients do not need to be applied to the remaining transmitted symbols. This embodiment provides the advantage that no extra multiplications are required on the transmitter side, as the LTRN sequence may simply be looked up in a table.

With a second embodiment, the channel may be estimated without knowledge of the per-subcarrier beamforming coefficients. With this embodiment, the coefficients must be applied to the remaining transmitted symbols. An advantage of this embodiment is that the receiver channel estimation is simplified (fewer multiplies), but the transmitter performs additional multiplications.

With the first embodiment, the following equations apply (using earlier notation and L=M:

$$\hat{H}_k = \frac{1}{M} \cdot s_{00,k}^* \cdot W_{B,k}^H \cdot W_T^H \cdot X_k$$

$$W_{B,k} = \mathrm{diag}\left(\begin{bmatrix} 1 & e^{\frac{i \cdot \pi \cdot l_1}{6}} & \ldots & e^{\frac{i \cdot \pi \cdot l_{M-1}}{6}} \end{bmatrix}\right)$$

With the second embodiment, the following equation applies (using earlier notation and L=M:

$$\hat{H}_k = \frac{1}{M} \cdot s_{00,k}^* \cdot W_T^H \cdot X_k$$

Further refinement of the channel estimate is possible by duplicating the entire length-M sequence p times. The refinement may be made by simple averaging. The overhead is identical to the single active transmitter method described on slide 10, but the performance is far superior.

For the backward-compatible preamble case, in which the number of long training symbols is M+1, the longer sequence would consist of p*M+1 long training symbols. There are p identical blocks of M symbols, and the first and second symbols on each antenna are identical.

Figure 18:
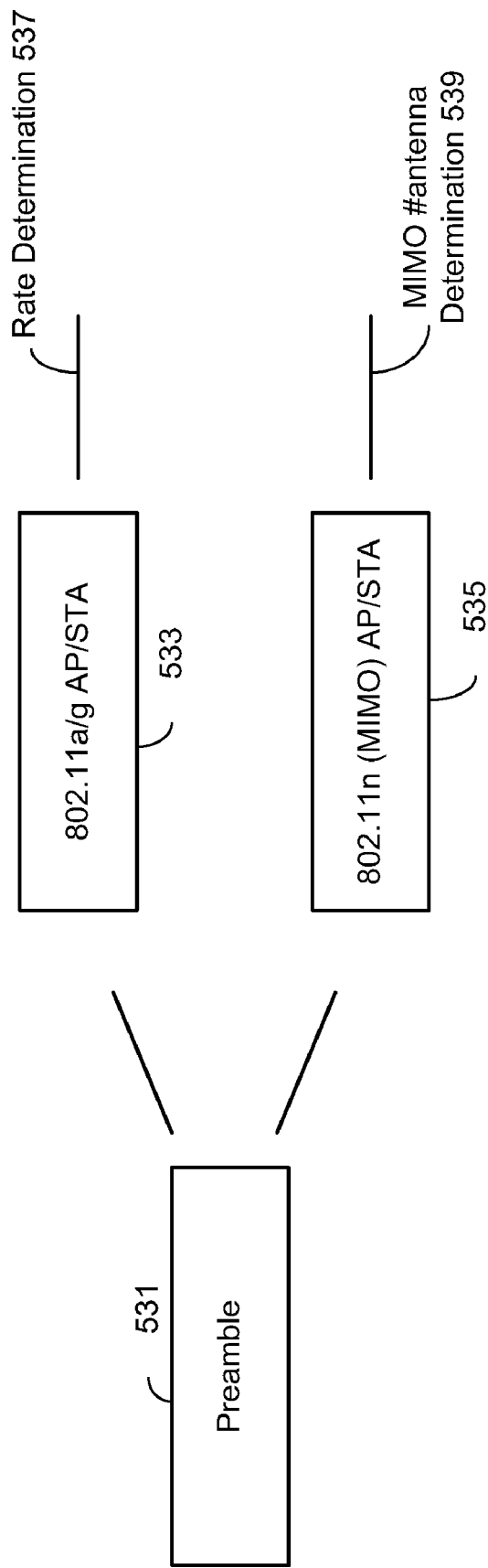
FIG. 18 is a block diagram illustrating the manner in which legacy and next generation WLAN devices interpret information contained in a header of a frame that is backwards compatible.

FIG. 18 is a block diagram illustrating the manner in which legacy and next generation WLAN devices interpret information contained in a header of a frame that is backwards compatible. To reduce receiver computational complexity, the transmit antenna and preamble 531 configuration needs to be encoded in the legacy SIGNAL field 533. The alternative is to have the receiver compute 4 different channel estimates and then select the antenna/preamble configuration 535 that results in a parity bit match and only legal values in the SIGNAL2 (MIMO extensions) field.

According to one aspect of the present invention, if the Reserved bit in the SIGNAL field is set, the Rate bits 537 are re-interpreted using the "MIMO interpretation" 539. For MIMO receivers, with which the rate is determined to be fixed, the Rate bits no longer specify the actual rate. Instead, they specify a dummy rate which, in combination with the length field uniquely identify the length of the frame in symbols and the TX antenna/preamble configuration.

For example, for 54 Mbps, there are 27 possible numbers of bytes in the length field that yield the same frame duration in symbols. These 27 possibilities can encode the TX antenna/preamble configuration. In the following Table 1, three encodings are shown. Note that we may simply be able to use the "6 Mbps" Rate to uniquely specify all lengths and tx antenna/preamble configurations. In this case, the other Rate codes would not be used if the Reserved bit is set. The only disadvantage is that we lose the ability to encode other preamble choices.

TABLE 1

Rate Field Interpretation

| Rate bits | 802.11a interpretation (reserved bit = 0) | MIMO interpretation (reserved bit = 1) |
|---|---|---|
| 1101 | 6 Mbps | length mod 3 = 1 => 2 TX antennas<br>length mod 3 = 2 => 3 TX antennas<br>length mod 3 = 3 => 4 TX antennas |
| 1111 | 9 Mbps | N/A |
| 0101 | 12 Mbps | length mod 6 = 1 => 2 TX antennas<br>length mod 6 = 2 => 3 TX antennas<br>length mod 6 = 3 => 4 TX antennas |
| 0111 | 18 Mbps | length mod 9 = 1 => 2 TX antennas<br>length mod 9 = 2 => 3 TX antennas<br>length mod 9 = 3 => 4 TX antennas |
| 1001 | 24 Mbps | length mod 12 = 1 => 2 TX antennas<br>length mod 12 = 2 => 3 TX antennas<br>length mod 12 = 3 => 4 TX antennas |
| 1011 | 36 Mbps | length mod 18 = 1 => 2 TX antennas<br>length mod 18 = 2 => 3 TX antennas<br>length mod 18 = 3 => 4 TX antennas |
| 0001 | 48 Mbps | length mod 24 = 1 => 2 TX antennas<br>length mod 24 = 2 => 3 TX antennas<br>length mod 24 = 3 => 4 TX antennas |
| 0011 | 54 Mbps | length mod 27 = 1 => 2 TX antennas<br>length mod 27 = 2 => 3 TX antennas<br>length mod 27 = 3 => 4 TX antennas |

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In some embodiments, the long training sequence for MIMO WLAN systems of the present invention substantially meets the needs described in the DESCRIPTION OF RELATED ART section and others. In one embodiment, a method for configuring a multiple input multiple output (MIMO) wireless communication begins by generating a plurality of preambles for a plurality of transmit antennas. Each of the plurality of preambles includes a carrier detection sequence at a legacy transmit rate, a first channel sounding at the legacy transmit rate, a signal field at the legacy transmit rate, and Z−1 channel soundings at a MIMO transmit rate, where L corresponds to a number of channel soundings. The method continues by simultaneously transmitting the plurality of preambles via the plurality of transmit antennas.

In another embodiment, a method for generating a training symbol sequence for a multiple-output OFDM RFIC begins by generating M+1 OFDM symbols, where M is the number of RF outputs. The method continues by selecting the symbol transmitted at the first time instant on the second to Mth antennas to be the first symbol transmitted at the first time instance on the first antenna multiplied by a real scalar value multiplied by the first column of an M×M unitary matrix. The method continues by selecting the symbol transmitted at the third to (M+1)th time instants on the first to Mth antennas to be the first symbol transmitted at the first time instance on the first antenna multiplied by the second to Mth columns of the same unitary matrix. The method continues by selecting the symbol transmitted at the second time instant on the first to Mth antennas to be the first symbol transmitted at the first time instant on the first to Mth antennas.

In yet another embodiment, a method for generating a training symbol sequence for a multiple-output OFDM RF transceiver begins by generating p*M OFDM symbols, where M is the number of RF outputs and p is an integer greater than 1. The method continues by selecting the symbol transmitted at the first time instant on the second to Mth antennas to be the first symbol transmitted at the first time instance on the first antenna multiplied by a real scalar value multiplied by the first column of an M×M unitary matrix. The method continues by selecting the symbol transmitted at the second to Mth time instants on the first to Mth antennas to be the first symbol transmitted at the first time instance on the first antenna multiplied by the second to Mth columns of the same unitary matrix. The method continues by selecting the symbols transmitted on each of the M antennas at the (M+1)th to the (p*M)th time instants to be (p−1) duplicate copies of the first M symbols transmitted on each of the M antennas.

In a further embodiment, A method for computing an estimate of an N×M channel matrix for each of J subcarriers of a received OFDM transmission, N being the number of expected transmit antennas and M being the number of receive antennas begins by removing the first K samples of each block of I+K, I>=J samples. The method continues by applying a discrete Fourier transform to the remaining I samples of each block. The method continues by selecting from each output block of I samples the J subcarriers known to be excited at the transmitter with nonzero symbols. The method continues by forming an N×M matrix of such outputs from each of the J subcarriers, each column of the matrix corresponding to the outputs on the jth subcarrier over M consecutive time instants from one receiver antenna and each row of the matrix corresponding to the outputs on the jth subcarrier over one time instant from all N receiver antennas. The method continues by post-multiplying this matrix by the Hermitian transpose of the M×M unitary matrix used to multiply the known first symbol sent on the first transmit antenna. The method continues by multiplying the resulting N×M matrix by the complex conjugate of the known first symbol sent on the first transmit antenna.

In yet a further embodiment, a radio frequency integrated circuit (RFIC) transmitter includes a baseband processing module and a radio frequency transmitter section. The baseband processing module is operably coupled to generate a plurality of preambles. The radio frequency (RF) transmitter section is operably coupled to transmit the plurality of preambles at a radio frequency via a plurality of antennas. The baseband processing module generates the plurality of preambles to include a carrier detection sequence at a legacy transmit rate, a first channel sounding at the legacy transmit rate, a signal field at the legacy transmit rate, and L−1 channel soundings at a MIMO transmit rate, where L corresponds to a number of channel soundings.

The preceding discussion has presented a method and apparatus for updating a channel estimation based on payload of a frame. As one of average skill in the art will appreciate, other embodiments may be derived from the present discussion without deviating from the scope of the claims.

What is claimed is:

1. An apparatus, comprising:
a baseband processing module that is operative to:
   generate a plurality of preambles to be transmitted respectively via a plurality of antennae, each respective preamble of the plurality of preambles includes a respective first channel sounding at a legacy transmit rate and a respective plurality of channel soundings at a multiple input multiple output (MIMO) transmit rate; and
   weight each respective first channel sounding at the legacy transmit rate and each respective channel sounding of the plurality of channel soundings at the MIMO transmit rate by a respective weighting factor corresponding to that respective channel sounding's number and a respective antenna on which that respective preamble is transmitted thereby generating a plurality of outbound symbol streams; and
a plurality of radio frequency (RF) transmitters that is operative to process the plurality of outbound symbol streams thereby generating a plurality of RF signals; and
wherein:
the plurality of antennae respectively transmits the plurality of RF signals via a communication channel.

2. The apparatus of claim 1, further comprising:
at least one additional apparatus that is operative to receive the plurality of RF signals from the communication channel; and wherein:
the at least one additional apparatus includes at least one additional plurality of antennae, a plurality of RF receivers, and at least one additional baseband processing module;
the at least one additional plurality of antennae is operative to receive the plurality of RF signals from the communication channel; and
the plurality of RF receivers is operative to process the plurality of RF signals received by the at least one additional plurality of antennae thereby generating a plurality of inbound symbol streams;
the at least one additional baseband processing module, coupled to receive the plurality of inbound symbol streams respectively from the plurality of RF receivers, that is operative to:
   process each of the plurality of inbound symbol streams thereby extracting the respective first channel sounding at the legacy transmit rate and the respective plurality of channel soundings at the MIMO transmit rate there from;
   make a first channel estimate of the communication channel using at least one respective first channel sounding corresponding to a respective at least one of the plurality of inbound symbol streams;
   make a second channel estimate of the communication channel using at least one respective plurality of channel soundings at the MIMO transmit rate corresponding to a respective at least one of the plurality of inbound symbol streams; and
   update the first channel estimate using the second channel estimate.

3. The apparatus of claim 1, wherein:
the baseband processing module is operative to employ a weighting factor matrix to weight the each respective first channel sounding at the legacy transmit rate and the each respective channel sounding of the plurality of channel soundings at the MIMO transmit rate in accordance with beamforming; and the weighting factor matrix includes a plurality of respective weights that weight the each respective first channel sounding at the legacy transmit rate and the each respective channel sounding of the plurality of channel soundings at the MIMO transmit rate.

4. The apparatus of claim 3, wherein:
the baseband processing module is operative to generate the weighting factor matrix using predetermined beam forming coefficients.

5. The apparatus of claim 1, wherein:
the plurality of antennae respectively transmits the plurality of RF signals simultaneously via a communication channel;
the baseband processing module is operative to employ a weighting factor matrix to weight the each respective first channel sounding at the legacy transmit rate and the each respective channel sounding of the plurality of channel soundings at the MIMO transmit rate in accordance with beamforming; and
the weighting factor matrix is operative to steer nulls, formed within the plurality of RF signals, in a predetermined direction.

6. The apparatus of claim 1, wherein:
the baseband processing module is operative to perform digital transmitter operations; and
at least one of the digital transmitter operations is space-time encoding applied to the plurality of preambles.

7. The apparatus of claim 1, wherein:
the baseband processing module is operative to perform digital transmitter operations; and
at least one of the digital transmitter operations is interleaving applied to at least one of the plurality of preambles.

8. The apparatus of claim 1, wherein:
the plurality of RF signals are all transmitted at substantially equal energy levels.

9. The apparatus of claim 1, wherein:
the each respective preamble also includes a respective signal field that includes respective rate bits therein; and
the respective rate bits indicate a transmit antenna configuration of the plurality of antennae of the apparatus and a preamble configuration of the corresponding preamble of the plurality of preambles.

10. The apparatus of claim 1, wherein:
the apparatus is a base station, an access point (AP), a network hardware component, cellular telephone, a laptop computer, a personal computer, or a personal digital assistant.

11. An apparatus, comprising:
a baseband processing module that is operative to:
generate a plurality of preambles to be transmitted respectively via a plurality of antennae, each respective preamble of the plurality of preambles includes a respective first channel sounding at a legacy transmit rate and a respective plurality of channel soundings at a multiple input multiple output (MIMO) transmit rate;
weight each respective first channel sounding at the legacy transmit rate and each respective channel sounding of the plurality of channel soundings at the MIMO transmit rate by a respective weighting factor corresponding to that respective channel sounding's number and a respective antenna on which that respective preamble is transmitted; and
space time encode the weighted, plurality of preambles thereby generating a plurality of outbound symbol streams; and
a plurality of radio frequency (RF) transmitters that is operative to process the plurality of outbound symbol streams thereby generating a plurality of RF signals; and
wherein:
the plurality of antennae respectively transmits the plurality of RF signals simultaneously via a communication channel.

12. The apparatus of claim 11, wherein:
the baseband processing module is operative to employ a weighting factor matrix to weight the each respective first channel sounding at the legacy transmit rate and the each respective channel sounding of the plurality of channel soundings at the MIMO transmit rate in accordance with beamforming; and
the weighting factor matrix includes a plurality of respective weights that weight the each respective first channel sounding at the legacy transmit rate and the each respective channel sounding of the plurality of channel soundings at the MIMO transmit rate.

13. The apparatus of claim 12, wherein:
the baseband processing module is operative to generate the weighting factor matrix using predetermined beam forming coefficients.

14. The apparatus of claim 11, wherein:
the baseband processing module is operative to employ a weighting factor matrix to weight the each respective first channel sounding at the legacy transmit rate and the each respective channel sounding of the plurality of channel soundings at the MIMO transmit rate in accordance with beamforming; and
the weighting factor matrix is operative to steer nulls, formed within the plurality of RF signals, in a predetermined direction.

15. The apparatus of claim 11, wherein:
the baseband processing module is operative to perform digital transmitter operations; and
at least one of the digital transmitter operations is interleaving applied to at least one of the plurality of preambles.

16. The apparatus of claim 11, wherein:
the plurality of RF signals are all transmitted at substantially equal energy levels.

17. The apparatus of claim 11, wherein:
the each respective preamble also includes a respective signal field that includes respective rate bits therein; and
the respective rate bits indicate a transmit antenna configuration of the plurality of antennae of the apparatus and a preamble configuration of the corresponding preamble of the plurality of preambles.

18. The apparatus of claim 11, wherein:
the apparatus is a base station, an access point (AP), a network hardware component, cellular telephone, a laptop computer, a personal computer, or a personal digital assistant.

19. An apparatus, comprising:
a baseband processing module that is operative to:
generate a plurality of preambles to be transmitted respectively via a plurality of antennae, each respective preamble of the plurality of preambles includes a respective first channel sounding at a legacy transmit rate and a respective plurality of channel soundings at a multiple input multiple output (MIMO) transmit rate;

generate a weighting factor matrix using predetermined beam forming coefficients;

employ the weighting factor matrix to weight each respective first channel sounding at the legacy transmit rate and each respective channel sounding of the plurality of channel soundings at the MIMO transmit rate by a respective weighting factor corresponding to that respective channel sounding's number and a respective antenna on which that respective preamble is transmitted; and space time encode the weighted, plurality of preambles thereby generating a plurality of outbound symbol streams; and a plurality of radio frequency (RF) transmitters that is operative to process the plurality of outbound symbol streams thereby generating a plurality of RF signals; and wherein:

the plurality of antennae respectively transmits the plurality of RF signals simultaneously, at substantially equal energy levels, via a communication channel.

20. The apparatus of claim 19, wherein:

the apparatus is a base station, an access point (AP), a network hardware component, cellular telephone, a laptop computer, a personal computer, or a personal digital assistant.

* * * * *